US012770134B2

(12) United States Patent
Lutz et al.

(10) Patent No.: US 12,770,134 B2
(45) Date of Patent: Oct. 20, 2026

(54) CONFIGURING APPLICATIONS ON A DEVICE USING A CONTACTLESS CARD

(71) Applicant: Capital One Services, LLC, McLean, VA (US)

(72) Inventors: Wayne Lutz, Fort Washington, MD (US); Kevin Osborn, Newton, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/664,460

(22) Filed: May 23, 2022

(65) Prior Publication Data

US 2023/0376936 A1 Nov. 23, 2023

(51) Int. Cl.
*G06Q 20/34* (2012.01)
*G06Q 20/38* (2012.01)

(52) U.S. Cl.
CPC ..... *G06Q 20/352* (2013.01); *G06Q 20/38215* (2013.01)

(58) Field of Classification Search
CPC ................................ G06Q 20/352; G06F 8/61
See application file for complete search history.

(56) References Cited

U.S. PATENT DOCUMENTS 4,683,553 A 7/1987 Mollier
4,827,113 A 5/1989 Rikuna
4,910,773 A 3/1990 Hazard et al.
5,036,461 A 7/1991 Elliott et al.
5,363,448 A 11/1994 Koopman, Jr. et al.
5,377,270 A 12/1994 Koopman, Jr. et al.
5,533,126 A 7/1996 Hazard
5,537,314 A 7/1996 Kanter
5,590,038 A 12/1996 Pitroda
5,592,553 A 1/1997 Guski et al.
(Continued)

FOREIGN PATENT DOCUMENTS

CA 3010336 A1 7/2017
CN 101192295 A 6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Ryan D Donlon
*Assistant Examiner* — Amanulla Abdullaev
(74) *Attorney, Agent, or Firm* — KDW Firm, PLLC

(57) ABSTRACT

Systems, methods, apparatuses, and computer-readable media for configuring applications on a device using a contactless card. An application executing on a device may receive a cryptogram from a contactless card associated with an account. The application may transmit the cryptogram to a server. The application may receive, based on the cryptogram, configuration information for a plurality of applications associated with the account. The application may modify a respective configuration of each application on the device based on the configuration information.

20 Claims, 15 Drawing Sheets

(56) References Cited

U.S. PATENT DOCUMENTS

| | | | |
|---|---|---|---|
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,276,814 | B1 | 10/2012 | Davis |
| 8,285,329 | B1 | 10/2012 | Zhu |
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,346,670 | B2 | 1/2013 | Hasson |
| 8,365,988 | B1 | 2/2013 | Medina, III et al. |
| 8,369,960 | B2 | 2/2013 | Tran et al. |
| 8,371,501 | B1 | 2/2013 | Hopkins |
| 8,381,307 | B2 | 2/2013 | Cimino |
| 8,391,719 | B2 | 3/2013 | Alameh et al. |
| 8,417,231 | B2 | 4/2013 | Sanding et al. |
| 8,439,271 | B2 | 5/2013 | Smets et al. |
| 8,475,367 | B1 | 7/2013 | Yuen et al. |
| 8,489,112 | B2 | 7/2013 | Roeding et al. |
| 8,511,542 | B2 | 8/2013 | Pan |

(56) References Cited

U.S. PATENT DOCUMENTS

| | | | |
|---|---|---|---|
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Bailey et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | de Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,467,622 B1 * | 11/2019 | Rule | G06Q 20/351 |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 * | 11/2019 | Osborn | H04L 9/3226 |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |

(56) References Cited

U.S. PATENT DOCUMENTS

| | | | |
|---|---|---|---|
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Landau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham, II et al. |
| 2008/0209543 | A1 | 8/2008 | Aaron |
| 2008/0223918 | A1 | 9/2008 | Williams et al. |
| 2008/0285746 | A1 | 11/2008 | Landrock et al. |
| 2008/0308641 | A1 | 12/2008 | Finn |
| 2009/0037275 | A1 | 2/2009 | Pollio |
| 2009/0048026 | A1 | 2/2009 | French |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Ameil et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadarajan |
| 2011/0125638 | A1 | 5/2011 | Davis et al. |
| 2011/0131415 | A1 | 6/2011 | Schneider |
| 2011/0153437 | A1 | 6/2011 | Archer et al. |
| 2011/0153496 | A1 | 6/2011 | Royyuru |
| 2011/0155801 | A1 | 6/2011 | Rowberry |
| 2011/0208658 | A1 | 8/2011 | Makhotin |
| 2011/0208965 | A1 | 8/2011 | Machani |
| 2011/0211219 | A1 | 9/2011 | Bradley et al. |
| 2011/0218911 | A1 | 9/2011 | Spodak |
| 2011/0238564 | A1 | 9/2011 | Lim et al. |
| 2011/0246780 | A1 | 10/2011 | Yeap et al. |
| 2011/0258452 | A1 | 10/2011 | Coulier et al. |
| 2011/0280406 | A1 | 11/2011 | Ma et al. |
| 2011/0282785 | A1 | 11/2011 | Chin |
| 2011/0294418 | A1 | 12/2011 | Chen |
| 2011/0312271 | A1 | 12/2011 | Ma et al. |
| 2012/0024947 | A1 | 2/2012 | Naelon |
| 2012/0030047 | A1 | 2/2012 | Fuentes et al. |
| 2012/0030121 | A1 | 2/2012 | Grellier |
| 2012/0047071 | A1 | 2/2012 | Mullen et al. |
| 2012/0079281 | A1 | 3/2012 | Lowenstein et al. |
| 2012/0109735 | A1 | 5/2012 | Krawczewicz et al. |
| 2012/0109764 | A1 | 5/2012 | Martin et al. |
| 2012/0143703 | A1 | 6/2012 | Wall |
| 2012/0143754 | A1 | 6/2012 | Patel |
| 2012/0150737 | A1 | 6/2012 | Rottink et al. |
| 2012/0178366 | A1 | 7/2012 | Levy et al. |
| 2012/0196583 | A1 | 8/2012 | Kindo |
| 2012/0207305 | A1 | 8/2012 | Gallo et al. |
| 2012/0209773 | A1 | 8/2012 | Ranganathan |
| 2012/0238206 | A1 | 9/2012 | Singh et al. |
| 2012/0239560 | A1 | 9/2012 | Pourfallah et al. |
| 2012/0252350 | A1 | 10/2012 | Steinmetz et al. |
| 2012/0254394 | A1 | 10/2012 | Barras |

(56) References Cited

U.S. PATENT DOCUMENTS

2012/0284194 A1 11/2012 Liu et al.
2012/0290472 A1 11/2012 Mullen et al.
2012/0296818 A1 11/2012 Nuzzi et al.
2012/0316992 A1 12/2012 Oborne
2012/0317035 A1 12/2012 Royyuru et al.
2012/0317628 A1 12/2012 Yeager
2013/0005245 A1 1/2013 Royston
2013/0008956 A1 1/2013 Ashfield
2013/0026229 A1 1/2013 Jarman et al.
2013/0030997 A1 1/2013 Spodak
2013/0048713 A1 2/2013 Pan
2013/0054474 A1 2/2013 Yeager
2013/0065564 A1 3/2013 Conner et al.
2013/0080228 A1 3/2013 Fisher
2013/0080229 A1 3/2013 Fisher
2013/0099587 A1 4/2013 Lou et al.
2013/0104251 A1 4/2013 Moore et al.
2013/0106576 A1 5/2013 Hinman et al.
2013/0119130 A1 5/2013 Braams
2013/0130614 A1 5/2013 Busch-Sorensen
2013/0144793 A1 6/2013 Royston
2013/0146657 A1 6/2013 Graef
2013/0171929 A1 7/2013 Adams et al.
2013/0179351 A1 7/2013 Wallner
2013/0185772 A1 7/2013 Jaudon et al.
2013/0191279 A1 7/2013 Calman et al.
2013/0200999 A1 8/2013 Spodak et al.
2013/0211937 A1 8/2013 Elbirt
2013/0216108 A1 8/2013 Hwang et al.
2013/0226791 A1 8/2013 Springer et al.
2013/0226796 A1 8/2013 Jiang et al.
2013/0232082 A1 9/2013 Krawczewicz et al.
2013/0238894 A1 9/2013 Ferg et al.
2013/0282360 A1 10/2013 Shimota et al.
2013/0303085 A1 11/2013 Boucher et al.
2013/0304651 A1 11/2013 Smith
2013/0311363 A1 11/2013 Ramaci
2013/0312082 A1 11/2013 Izu et al.
2013/0314593 A1 11/2013 Reznik et al.
2013/0344857 A1 12/2013 Berionne et al.
2014/0002238 A1 1/2014 Taveau et al.
2014/0019352 A1 1/2014 Shrivastava
2014/0020068 A1* 1/2014 Desai ................. G06Q 20/3227 726/4
2014/0027506 A1 1/2014 Heo et al.
2014/0032409 A1 1/2014 Rosano
2014/0032410 A1 1/2014 Georgiev et al.
2014/0040120 A1 2/2014 Cho et al.
2014/0040139 A1 2/2014 Brudnicki et al.
2014/0040147 A1 2/2014 Varadarakan et al.
2014/0047235 A1 2/2014 Lessiak et al.
2014/0067690 A1 3/2014 Pitroda et al.
2014/0074637 A1 3/2014 Hammad
2014/0074655 A1 3/2014 Lim et al.
2014/0081720 A1 3/2014 Wu
2014/0081785 A1 3/2014 Valadas Preto
2014/0095625 A1* 4/2014 Quan ..................... G06F 9/461 709/205
2014/0136640 A1* 5/2014 Shih ........................ H04L 51/08 709/206
2014/0138435 A1 5/2014 Khalid
2014/0171034 A1 6/2014 Aleksin et al.
2014/0171039 A1 6/2014 Bjontegard
2014/0172700 A1 6/2014 Teuwen et al.
2014/0180851 A1 6/2014 Fisher
2014/0208112 A1 7/2014 McDonald et al.
2014/0214674 A1 7/2014 Narula
2014/0229375 A1 8/2014 Zaytzsev et al.
2014/0245391 A1 8/2014 Adenuga
2014/0256251 A1 9/2014 Caceres et al.
2014/0258099 A1 9/2014 Rosano
2014/0258113 A1 9/2014 Gauthier et al.
2014/0258125 A1 9/2014 Gerber et al.
2014/0274179 A1 9/2014 Zhu et al.
2014/0279479 A1 9/2014 Maniar et al.
2014/0337235 A1 11/2014 Van Heerden et al.
2014/0339315 A1 11/2014 Ko
2014/0346860 A1 11/2014 Aubry et al.
2014/0365377 A1 12/2014 Salama
2014/0365780 A1 12/2014 Movassaghi
2014/0379361 A1 12/2014 Mahadkar et al.
2015/0012444 A1 1/2015 Brown et al.
2015/0032635 A1 1/2015 Guise
2015/0071486 A1 3/2015 Rhoads et al.
2015/0073983 A1 3/2015 Bartenstein
2015/0088757 A1 3/2015 Zhou et al.
2015/0089586 A1 3/2015 Ballesteros
2015/0113271 A1 4/2015 Jooste
2015/0134452 A1 5/2015 Williams
2015/0134513 A1 5/2015 Olson
2015/0140960 A1 5/2015 Powell et al.
2015/0154595 A1 6/2015 Collinge et al.
2015/0170138 A1 6/2015 Rao
2015/0172060 A1* 6/2015 Mahaffey .................. G06F 8/70 713/176
2015/0178724 A1 6/2015 Ngo et al.
2015/0186871 A1 7/2015 Laracey
2015/0199673 A1 7/2015 Savolainen
2015/0199863 A1 7/2015 Scoggins
2015/0205379 A1 7/2015 Mag et al.
2015/0254637 A1 9/2015 Yang
2015/0302409 A1 10/2015 Malek et al.
2015/0317295 A1 11/2015 Sherry
2015/0317626 A1 11/2015 Ran et al.
2015/0332266 A1 11/2015 Friedlander et al.
2015/0339474 A1 11/2015 Paz et al.
2015/0371234 A1 12/2015 Huang et al.
2016/0012465 A1 1/2016 Sharp
2016/0026997 A1 1/2016 Tsui et al.
2016/0048913 A1 2/2016 Rausaria et al.
2016/0055480 A1 2/2016 Shah
2016/0057619 A1 2/2016 Lopez
2016/0065370 A1 3/2016 Le Saint et al.
2016/0078430 A1 3/2016 Douglas
2016/0087957 A1 3/2016 Shah et al.
2016/0092696 A1 3/2016 Guglani et al.
2016/0148193 A1 5/2016 Kelley et al.
2016/0189143 A1 6/2016 Koeppel
2016/0227343 A1* 8/2016 Shen ....................... H04L 67/34
2016/0232523 A1 8/2016 Venot et al.
2016/0239672 A1 8/2016 Khan et al.
2016/0253651 A1 9/2016 Park et al.
2016/0255072 A1 9/2016 Liu
2016/0267486 A1 9/2016 Mitra et al.
2016/0277383 A1 9/2016 Guyomarc'h et al.
2016/0277388 A1 9/2016 Lowe et al.
2016/0307187 A1 10/2016 Guo et al.
2016/0307189 A1 10/2016 Zarakas et al.
2016/0314472 A1 10/2016 Ashfield
2016/0330027 A1 11/2016 Ebrahimi
2016/0335531 A1 11/2016 Mullen et al.
2016/0379217 A1 12/2016 Hammad
2017/0004502 A1 1/2017 Quentin et al.
2017/0011395 A1 1/2017 Pillai et al.
2017/0011406 A1 1/2017 Tunnell et al.
2017/0017957 A1 1/2017 Radu
2017/0017964 A1 1/2017 Janefalkar et al.
2017/0024716 A1 1/2017 Jiam et al.
2017/0039566 A1 2/2017 Schipperheijn
2017/0041759 A1 2/2017 Gantert et al.
2017/0068950 A1 3/2017 Kwon
2017/0103388 A1 4/2017 Pillai et al.
2017/0104739 A1 4/2017 Lansler et al.
2017/0109509 A1 4/2017 Baghdasaryan
2017/0109730 A1 4/2017 Locke et al.
2017/0116447 A1 4/2017 Cimino et al.
2017/0124568 A1 5/2017 Moghadam
2017/0140379 A1 5/2017 Deck
2017/0154328 A1 6/2017 Zarakas et al.
2017/0154333 A1 6/2017 Gleeson et al.
2017/0180134 A1 6/2017 King
2017/0188213 A1* 6/2017 Nirantar ................ H04L 67/564
2017/0230189 A1 8/2017 Toll et al.
2017/0237301 A1 8/2017 Elad et al.

(56) References Cited

U.S. PATENT DOCUMENTS

| | | | |
|---|---|---|---|
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0144310 A1* | 5/2018 | Li | G06Q 20/341 |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2019/0362341 A1* | 11/2019 | Chen | H04L 9/3247 |
| 2020/0184462 A1 | 6/2020 | Rule et al. | |
| 2020/0250659 A1 | 8/2020 | Rule et al. | |
| 2021/0004806 A1 | 1/2021 | Noe | |
| 2021/0012322 A1* | 1/2021 | Manchanda | G06Q 20/352 |
| 2021/0201296 A1 | 7/2021 | Rule et al. | |
| 2021/0272097 A1* | 9/2021 | Wen | H04L 9/3271 |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| CN | 103023643 | A | 4/2013 |
| CN | 103417202 | A | 12/2013 |
| EP | 1085424 | A1 | 3/2001 |
| EP | 1223565 | A1 | 7/2002 |
| EP | 1265186 | A2 | 12/2002 |
| EP | 1783919 | A1 | 5/2007 |
| EP | 2139196 | A1 | 12/2009 |
| EP | 1469419 | A1 | 8/2012 |
| EP | 2852070 | A1 | 3/2015 |
| GB | 2457221 | A | 8/2009 |
| GB | 2516861 | A | 2/2015 |
| GB | 2551907 | A | 1/2018 |
| KR | 101508320 | B1 | 4/2015 |
| KR | 20150140132 | A | 12/2015 |
| WO | 9910824 | A1 | 3/1999 |
| WO | 0049586 | A1 | 8/2000 |
| WO | 2006070189 | A2 | 7/2006 |
| WO | 2008055170 | A2 | 5/2008 |
| WO | 2009025605 | A2 | 2/2009 |
| WO | 2010049252 | A1 | 5/2010 |
| WO | 2011112158 | A1 | 9/2011 |
| WO | 2012001624 | A1 | 1/2012 |
| WO | 2013039395 | A1 | 3/2013 |
| WO | 2013155562 | A1 | 10/2013 |
| WO | 2013192358 | A2 | 12/2013 |
| WO | 2014043278 | A1 | 3/2014 |
| WO | 2014170741 | A2 | 10/2014 |
| WO | 2015179649 | A1 | 11/2015 |
| WO | 2015183818 | A1 | 12/2015 |
| WO | 2016097718 | A1 | 6/2016 |
| WO | 2016160816 | A1 | 10/2016 |
| WO | 2016168394 | A1 | 10/2016 |
| WO | 2017042375 | A1 | 3/2017 |
| WO | 2017042400 | A1 | 3/2017 |
| WO | 2017047855 | A1 | 3/2017 |
| WO | 2017157859 | A1 | 9/2017 |
| WO | 2017208063 | A1 | 12/2017 |
| WO | 2018063809 | A1 | 4/2018 |
| WO | 2018137888 | A1 | 8/2018 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://USA.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

(56) References Cited

OTHER PUBLICATIONS

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICAN at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
The International Search Report and Written Opinion mailed Jul. 26, 2023 for corresponding PCT/US2023/019567 (15 pages).
The International Preliminary Report on Patentability issued Nov. 7, 2024 for corresponding PCT/US2023/019567 (10 pages).
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

100

CONFIGURING APPLICATIONS ON A DEVICE USING A CONTACTLESS CARD

BACKGROUND

Configuring a new device or additional devices can be tedious, time consuming, and error prone. For example, a user may purchase a new device to replace another device. However, the new device does not include applications and/or configuration from the other device. Conventional solutions to configure devices are vulnerable to errors, have security risks, and are susceptible to malicious attacks.

SUMMARY

Systems, methods, apparatuses, and computer-readable media for configuring applications on a device using a contactless card. In one aspect, a method, includes receiving, by an application executing on a device, a cryptogram from a contactless card associated with an account, transmitting, by the application, the cryptogram to a server, receiving, by the application based on the cryptogram, configuration information for a plurality of applications associated with the account, and modifying a respective configuration of each application on the device based on the configuration information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
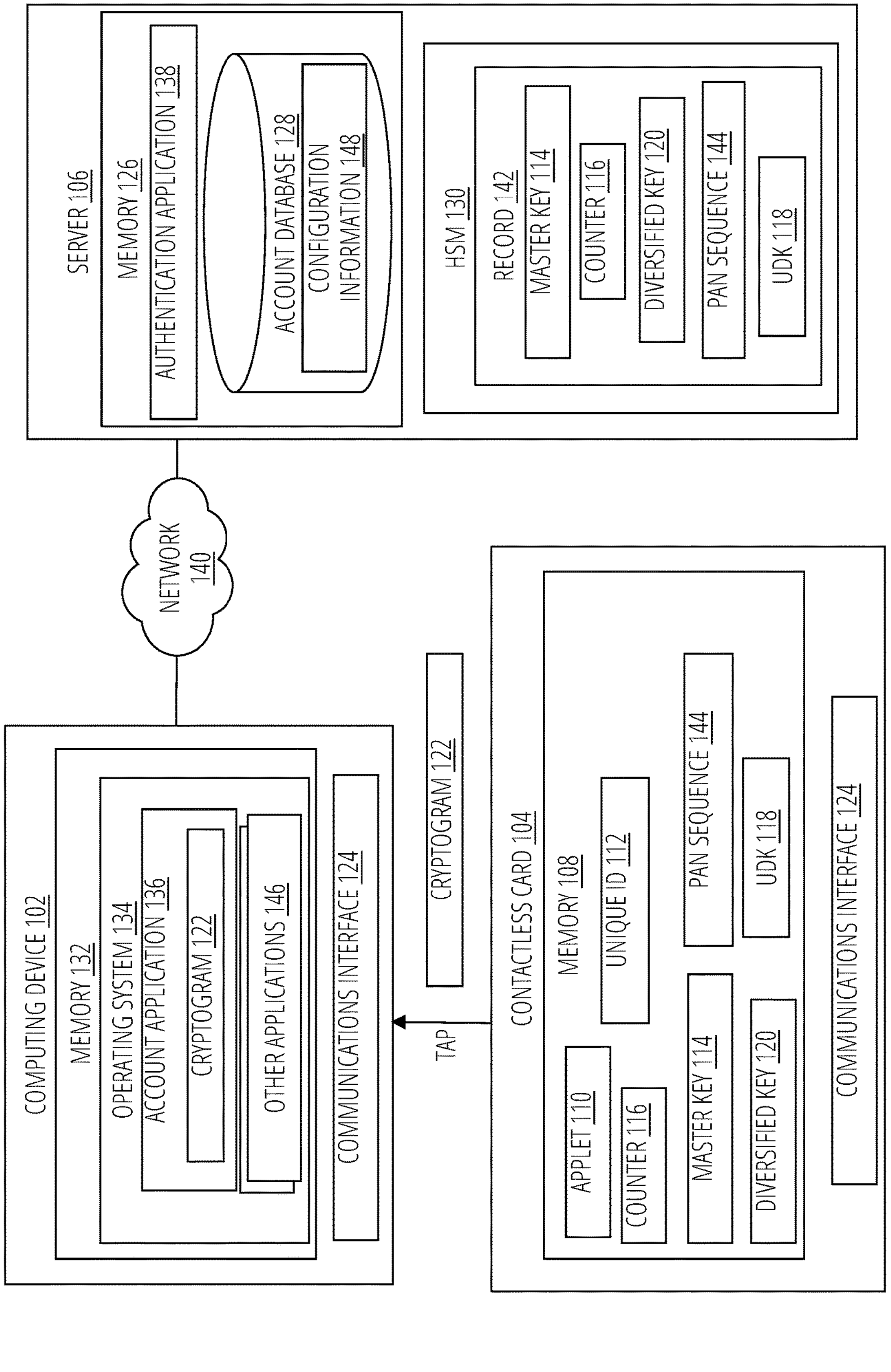
FIG. 1A illustrates an aspect of the subject matter in accordance with one embodiment.

Embodiments disclosed herein provide secure techniques to automatically configure a device, such as a smartphone, tablet, or any other computing device, using a contactless card. Examples of configuring a device may include installing applications on the device, uninstalling applications from the device, and/or configuring applications on the device (e.g., modifying application settings, application parameters, etc.). Initially, a user may register one or more applications and/or configuration information for one or more applications. Doing so may include storing information for a given device and/or account in an account database. The registration may associate the applications and/or configuration information with a contactless card.

Subsequently, a user may tap the contactless card to any device, which may include previously registered devices, new devices, existing devices, etc. In some embodiments, tapping the card to the device may cause the card to generate a cryptogram. In some embodiments, the cryptogram is a parameter of a uniform resource locator (URL). When the device receives the URL and/or the cryptogram, the device may launch an application, which may transmit the cryptogram to a server for verification. The server may verify the cryptogram based at least in part on decrypting the cryptogram.

In other embodiments, tapping the card to the device may cause the device to launch a web browser based on the URL. In such embodiments, the web browser may access a page associated with the URL. The server may identify the cryptogram as a parameter of the URL accessed by the web browser. The server may verify the cryptogram based at least in part on decrypting the cryptogram.

Regardless of the application that is launched responsive to tapping the card to the device, subsequent to verifying the cryptogram, the server may use the cryptogram (and/or a parameter of the cryptogram) to identify the associated applications and/or configuration information for the applications in the account database. The server may then transmit the configuration information to the requesting device. In some embodiments, the server sends the configuration information to the device via one or more push notifications. In some embodiments, such as when the configuration information has a size that exceeds a threshold size, the server may send one or more tokens to the device. The device may then use the tokens to request the configuration information from the server.

Once received, the device may apply the received configuration information to each application. For example, the configuration information may include account login credentials, server information to establish connections to one or more servers, user preferences, settings, and the like. In some embodiments, the configuration information may include information for one or more applications that are not installed on the device. In such embodiments, these applications may be downloaded and installed on the device based on the receipt of the configuration information. Similarly, the configuration information may include information for disabling or uninstalling existing applications. In such embodiments, the device may disable and/or uninstall these applications based on the configuration information. Furthermore, the device may prevent some applications from being enabled and/or reinstalled on the device based on the configuration information.

Advantageously, embodiments disclosed herein provide secure techniques to automatically configure devices using a contactless card. By requiring cryptographic verification to initiate the configuration, the security of the user's account, applications, devices, and data are improved. Furthermore, doing so ensures that the automatic device configuration is only performed when the user has access to a contactless card that facilitates the cryptogram verification with the server. Additionally, by providing the disclosed automatic configuration functionality, many different applications, operating systems, and/or devices can be automatically configured without requiring integration into every application, operating system, and/or device.

With general reference to notations and nomenclature used herein, the detailed descriptions herein may be presented in terms of program procedures executed on a computer or network of computers. These procedural descriptions and representations are used by those skilled in the art to effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through **123-*a* (or 123*a*) may include components 123-1, 123-2, 123-3, 123-4, and 123-5**. The embodiments are not limited in this context.

FIG. 1A depicts an exemplary computing architecture 100, also referred to as a system, consistent with disclosed embodiments. Although the computing architecture 100 shown in FIGS. 1A-1C has a limited number of elements in a certain topology, it may be appreciated that the computing architecture 100 may include more or less elements in alternate topologies as desired for a given implementation.

The computing architecture 100 comprises one or more computing devices 102, one or more servers 106, and one or more contactless cards 104. The contactless card 104 is representative of any type of card, such as a credit card, debit card, ATM card, gift card, payment card, smart card, and the like. The contactless card 104 may comprise one or more communications interfaces 124, such as a radio frequency identification (RFID) chip, configured to communicate with a communications interface 124 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device may be used as an example of the computing device 102, but should not be considered limiting of the disclosure. The server 106 is representative of any type of computing device, such as a server, workstation, compute cluster, cloud computing platform, virtualized computing system, and the like. Although not depicted for the sake of clarity, the computing device 102, contactless card 104, and server 106 each include one or more processor circuits, e.g., to execute programs, code, and/or instructions.

As shown, a memory 108 of the contactless card 104 includes an applet 110, a counter 116, one or more master keys 114, one or more diversified keys 120, a unique ID 112, a primary account number (PAN) sequence number 144, and one or more Unique Derived Keys (UDKs) 118. The unique ID 112 may be any identifier that uniquely identifies the contactless card 104 relative to other contactless cards 104. The PAN sequence 144 may include a counter value stored by the contactless card 104. The applet 110 is executable code configured to perform some or all of the operations described herein. The counter 116 is a value that is synchronized between the contactless card 104 and server 106. The counter 116 may comprise a number that changes each time data is exchanged between the contactless card 104 and the server 106 (and/or the contactless card 104 and the computing device 102). The counter 116, master keys 114, diversified keys 120, UDKs 118, PAN sequence 144, and/or unique ID 112 are used to provide security in the system 100 as described in greater detail below.

As shown, a memory 132 of the computing device 102 includes an instance of an operating system 134. Example operating systems include the Android® OS, iOS®, macOS®, Linux®, and Windows® operating systems. As shown, the operating system 134 includes an account application 136 and one or more other applications 146. The account application 136 allows users to perform various operations, such as configuring the device 102 based on the configuration information 148 stored by the server 106. In some embodiments the account application 136 may further perform other account-related operations such as activating payment cards, viewing account balances, purchasing items, processing payments, and the like. In some embodiments, a user may authenticate using authentication credentials to access certain features of the account application 136. For example, the authentication credentials may include a username (or login) and password, biometric credentials (e.g., fingerprints, Face ID, etc.), and the like. The other applications 146 are representative of any type of application, such as web browsers, email clients, messaging clients, social media applications, and the like.

As shown, a memory 126 of the server 106 includes an authentication application 138 and an account database 128. The account database 128 generally includes information related to an account holder (e.g., one or more users), one or more accounts of the account holder, and one or more contactless cards 104 of the account. For example, as shown, the account database 128 may include configuration information 148 for a plurality of accounts. The configuration information 148 may include any data to configure the computing device 102, the operating system 134, the account application 136, the other applications 146, and/or any component thereof. For example, the configuration information 148 may include information for connecting to one or more servers (e.g., internet protocol (IP) addresses, ports, etc.), account information (e.g., login/password), inbox contents (e.g., messages, emails, etc.), preferences, variable values, and/or settings. The configuration information 148 may further include executable files, scripts, etc., to install and/or configure one or more portions of the configuration information 148 on a given computing device 102. Embodiments are not limited in this context, as the configuration information 148 may be used to modify any attribute and/or feature of a computing device 102 and/or any software component thereof.

As stated, the configuration information 148 may be used to automatically configure the computing device 102. Stated differently, the configuration information 148 may represent a "backup" of at least a portion of a given device and/or account (including any applications, operating systems, and/or parameters thereof, such that any device may be restored to a state similar to the backup. For example, when a user purchases a new smartphone, the configuration information 148 from a previous smartphone may be used to automatically configure the new smartphone. For example, the configuration information 148 may be used to install applications on the new smartphone (e.g., applications that are not included with the smartphone when purchased but were installed on the previous smartphone and registered as part of the configuration information 148), remove applications from the new smartphone that were not installed on the previous smartphone (and/or remove restricted applications based on the configuration information 148), apply settings and/or parameters from the old smartphone to the new smartphone, and the like.

In various embodiments, a user may initially register the configuration information 148 with the server 106. For example, the user may access a feature of the account application 136, access a web page, or any other resource to register the configuration information 148 for any device and/or account. The configuration information 148 may be specific to all devices associated with an account and/or a subset of devices associated with an account. In addition and/or alternatively, the configuration information 148 may be specific to all applications associated with an account and/or a subset of applications associated with an account. In some embodiments, the account application 136 may gather information describing the computing device 102, e.g., installed applications, configuration files, etc., which may be stored as the configuration information 148. In other embodiments, a user may provide input specifying different applications, settings, features, etc., of a given device. In some embodiments, the configuration information 148 includes package names for each application to be registered, metadata describing the operating system 134 (e.g., device identifiers, device version, preferences, settings, etc.) to be registered, metadata describing each application to be registered, preferences, login information, application identities, or any other attribute of the device, application, operating system 134, and/or component thereof. Furthermore, the configuration information 148 may be associated with an account in the account database 128, which allows the server 106 to further associate the configuration information 148 with one or more contactless cards 104 associated with the account.

For example, a user may register a social media application and an email client with the server 106. Therefore, the configuration information 148 for the user may include respective package names of the social media application and the email client, connection information for the media application and the email client to connect to respective servers, user identities in the social media application and the email application, an email inbox (or folders) for the email client, social media profiles in the social media application, social media messages in the social media application, respective versions of the social media application and the email client, display settings (e.g., enabling dark mode in either application), enabling push notifications in either application, permissions for each application within the operating system 134, and the like. Embodiments are not limited in this context. Indications of this information may therefore be stored as the configuration information 148 for the account.

Thereafter, the user may desire to use the configuration information 148 to configure the computing device 102. For example, the computing device 102 may be a new smartphone, and the user may wish to configure the social media application and email client (e.g., to restore all emails in the email client, load their social media profile/settings in the social media application, etc.). In some embodiments, these applications may not be installed on the new smartphone, so the configuration information 148 may further be used to download the social media application and/or the email client for installation on the computing device 102. To initiate the configuration of a device based on the configuration information 148, the user may tap the contactless card 104 to the computing device 102.

In the embodiment depicted in FIG. 1A, the user may tap the contactless card 104 to the computing device 102 (or otherwise bring the contactless card 104 within communications range of the communications interface 124 of the device 102). The applet 110 may then generate a cryptogram 122. The cryptogram 122 may be generated based on any suitable cryptographic technique. In some embodiments, the cryptogram 122 may be based on the unique ID 112 of the contactless card 104. In some embodiments, the applet 110 may include the cryptogram 122 and an unencrypted identifier (e.g., the counter 116, the PAN sequence 144, the unique ID 112, and/or any other unique identifier) as part of a data package including the cryptogram 122. In at least one embodiment, the data package is an NDEF file.

As stated, the computing architecture 100 is configured to implement key diversification to secure data, which may be referred to as a key diversification technique herein. Generally, the server 106 (or another computing device) and the contactless card 104 may be provisioned with the same master key 114 (also referred to as a master symmetric key). More specifically, each contactless card 104 is programmed with a distinct master key 114 that has a corresponding pair in the hardware security module (HSM) 130 of the server 106. For example, when a contactless card 104 is manufactured, a unique master key 114 may be programmed into the memory 108 of the contactless card 104. Similarly, the unique master key 114 may be stored in a record 142 in the HSM 130.

Furthermore, when a given card 104 is manufactured, a UDK 118 may be diversified from the master key 114 via an HSM function that takes, as input, a diversification factor and a reference to the master key 114 index in the HSM 130 (e.g., an index to the record 142). In some embodiments, the diversification factor may be the unique ID 112 and/or PAN sequence 144 of the contactless card 104. The UDK 118 may be stored in the contactless card 104 and the record 142 of the HSM 130. The master key 114 and UDK 118 may be kept secret from all parties other than the contactless card 104 and server 106, thereby enhancing security of the system 100. Although depicted as being stored in the record 142, in some embodiments, the counter 116 and/or PAN sequence 144 are not stored in the HSM 130. For example, the unique ID 112, counter 116, and PAN sequence 144 may be stored in the account database 128.

In some embodiments, to generate the cryptogram 122, the applet 110 may provide the UDK 118, unique ID 112, and a diversification factor as input to a cryptographic algorithm, thereby producing a diversified key 120. In some embodiments, the diversification factor is the counter 116. In other embodiments, the PAN sequence 144 is the diversification factor. The diversified key 120 may then be used to encrypt some data, such as the diversification factor (e.g., the counter 116 and/or the PAN sequence 144) or other sensitive data. The applet 110 and the server 106 may be configured to encrypt the same type of data to facilitate the decryption and/or verification processing of a cryptogram.

As stated, the UDKs 118 of the contactless card 104 and server 106 may be used in conjunction with the counters 116 to enhance security using key diversification. As stated, the counters 116 comprise values that are synchronized between the contactless card 104 and server 106. The counter 116 may comprise a number that changes each time data is exchanged between the contactless card 104 and the server 106 (and/or the contactless card 104 and the computing device 102). When preparing to send data (e.g., to the server 106 and/or the device 102), the applet 110 of the contactless card 104 may increment the counter 116. The applet 110 of the contactless card 104 may then provide the UDK 118, unique ID 112, and counter 116 as input to a cryptographic algorithm, which produces a diversified key 120 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety. In some embodiments, the PAN sequence 144 is used as input to the cryptographic algorithm instead of the counter 116 to generate the diversified key 120, e.g., by encrypting the UDK 118, unique ID 112 and PAN sequence 144.

The applet 110 may then encrypt some data (e.g., the unique ID 112, the counter 116, the PAN sequence 144, a command, and/or any other data) using the diversified key 120 and the data as input to the cryptographic algorithm. For example, encrypting the unique ID 112 with the diversified key 120 may result in an encrypted unique ID 112 (e.g., a cryptogram 122). As stated, the applet 110 and the server 106 may be configured to encrypt the same data.

In some embodiments, two diversified keys 120 may be generated, e.g., based on one or more portions of the input to the cryptographic function. In some embodiments, the two diversified keys 120 are generated based on two distinct master keys 114, two distinct UDKs 118, the unique ID 112, and the counter 116 (or the PAN sequence 144). In such embodiments, a message authentication code (MAC) is generated using one of the diversified keys 120, and the MAC may be encrypted using the other one of the diversified keys 120. The MAC may be generated based on any suitable data input to a MAC algorithm, such as sensitive data, the unique ID 112, the counter 116, and/or the PAN sequence 144. More generally, the applet 110 and the server 106 may be configured to generate the MAC based on the same data. In some embodiments, the cryptogram 122 is included in a data package such as an NDEF file. The account application 136 may then read the data package including cryptogram 122 via the communications interface 124 of the computing device 102.

In some embodiments, the applet includes the cryptogram 122 as a parameter of a URL. For example, the URL may be "http://www.example.com/appconfig?param=ABC123&custID=123". In such an example, the cryptogram 122 may correspond to the parameter "ABC123" and the unique ID 112 may correspond to the parameter "custID". Once received by the operating system 134, the operating system 134 may open an application to process the URL. In some embodiments, the URL may be registered with the account application 136, which causes the operating system 134 to launch the account application 136 and provide the URL 120 as input to the account application 136. However, in other examples, the operating system 134 may launch a web browser and provide the URL as input to the web browser. In other embodiments, the cryptogram 122 is not a parameter of the URL but is transmitted with the URL in a data package such as an NDEF file. In such embodiments, the operating system 134 may read the data package including the URL and cryptogram 122 via the communications interface 124 of the computing device 102.

In the example depicted in FIG. 1A, the operating system 134 may launch the account application 136 based on reading the cryptogram 122. As stated, the cryptogram 122 may be a parameter of a URL. In such examples, the URL may be associated with the account application 136. Doing so causes the operating system 134 to launch the account application 136. The account application 136 may then extract the cryptogram 122 and transmit the cryptogram 122 to the server 106 for verification.

In embodiments where the cryptogram 122 is not a parameter of the URL, the operating system 134 may launch the account application 136 based on reading the cryptogram 122 and/or the NDEF file including the cryptogram 122. The operating system 134 may provide the cryptogram 122 to the account application 136. The account application 136 may then extract the cryptogram 122 and transmit the cryptogram 122 to the server 106 for verification.

In some embodiments the account application 136 (or another application to configure the computing device 102 based on the configuration information 148) may not be installed on the device. In some such embodiments, the operating system 134 may cause the account application 136 to be downloaded and installed on the computing device 102 based on the URL and/or the cryptogram 122. In other such embodiments, an application clip (e.g., an Apple® App Clip), instant application (e.g., an Android instant application), or progressive web application (e.g., an Android progressive web application) that includes the disclosed functionality of the account application 136 may be downloaded and installed on the computing device 102 to configure the computing device 102 based on the configuration information 148. In such embodiments, the app clips, instant applications, and/or progressive web applications may automatically be removed from the computing device 102 after the configuration information 148 is used to configure the computing device 102.

Figure 1B:
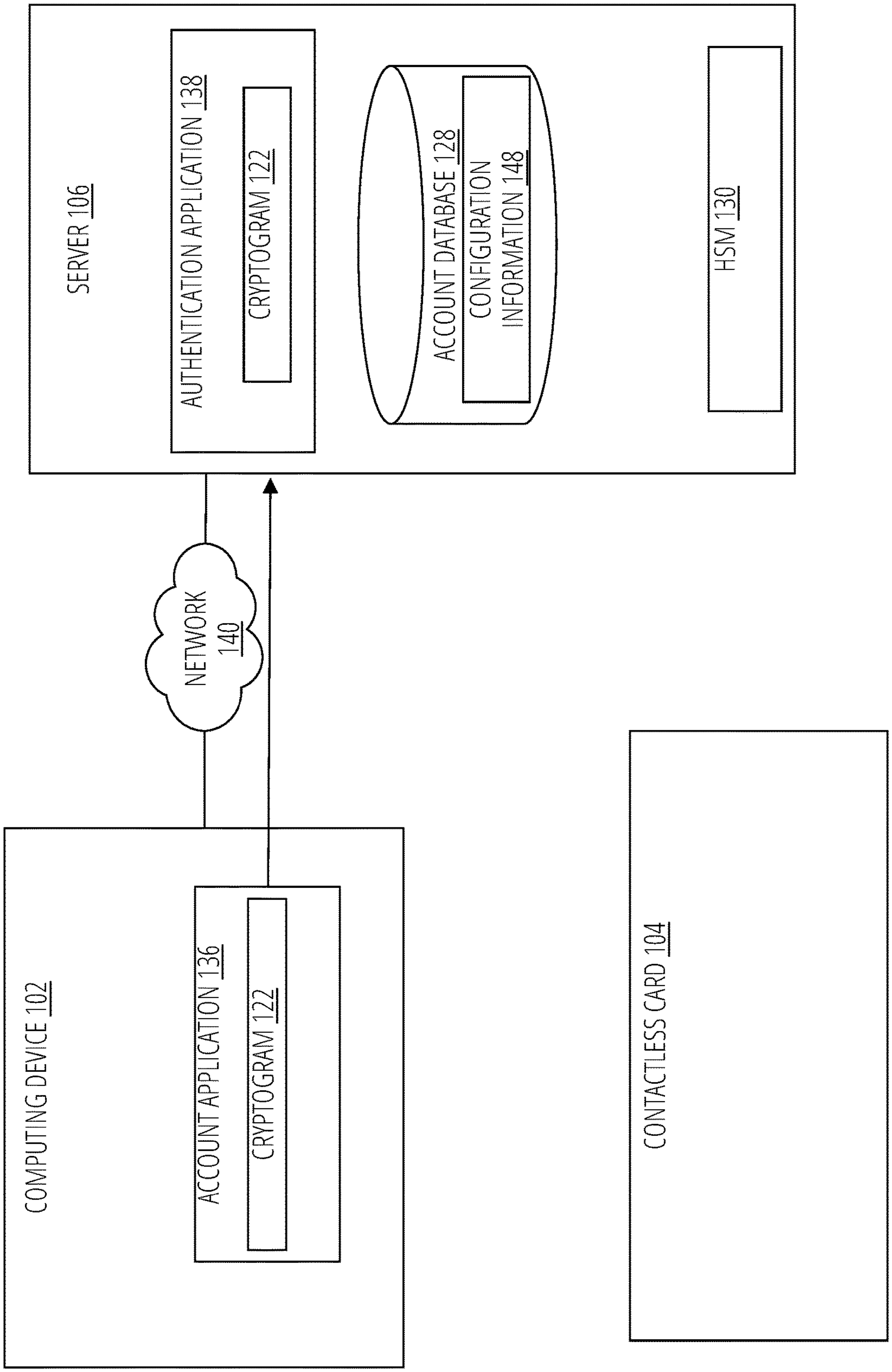
FIG. 1B illustrates an aspect of the subject matter in accordance with one embodiment.

FIG. 1B depicts an embodiment where the account application 136 transmits the cryptogram 122 to the server 106. The server 106 may provide the cryptogram 122 to the authentication application 138 and/or the HSM 130 for verification based at least in part on the instance of the master key 114 and/or UDK 118 stored by the server 106. In some embodiments, the authentication application 138 and/or the HSM 130 may identify the UDK 118 (or master key 114) and counter 116 using the unencrypted unique ID 112 provided to the server 106. In examples where the PAN sequence 144 is used to generate the cryptogram 122, the server 106 may identify the PAN sequence 144 in the account database 128 and/or HSM 130 using the unencrypted unique ID 112. In some examples, the authentication application 138 may provide the UDK 118, unique ID 112, and counter 116 as input to the cryptographic function of the HSM 130, which produces one or more diversified keys 120 as output. In other embodiments, the server encrypts the UDK 118, unique ID 112, and PAN sequence 144 to generate the diversified keys 120. The resulting diversified keys 120 may correspond to the diversified keys 120 of the contactless card 104, which may be used to decrypt the cryptogram 122 and/or verify the MAC once decrypted. For example, the server 106 may generate a MAC based on the same data as the applet 110, e.g., the sensitive data, the unique ID 112, the counter 116, and/or the PAN sequence 144. If the MAC generated by the server 106 matches the decrypted MAC in the cryptogram 122, the server 106 may verify or otherwise authenticate the cryptogram 122.

Regardless of the decryption technique used, the authentication application 138 and/or the HSM 130 may successfully decrypt the cryptogram 122 and verify the MAC, thereby verifying and/or authenticating the cryptogram 122. If the decryption and/or MAC verification is successful, the authentication application 138 may reference the account database 128 to identify the configuration information 148 for the account. In some embodiments, the authentication application 138 may access the configuration information 148 based on the unencrypted unique ID 112 provided to the server 106. Embodiments are not limited in this context, as any suitable identifier may be used to access the configuration information 148 for an account. The server 106 may further transmit, to the computing device 102 (e.g., to the account application 136 and/or the operating system 134), a response indicating that the server 106 verified the cryptogram 122 and that the configuration information 148 can be used to configure the computing device 102.

The authentication application 138 may then parse the configuration information 148 to identify each application, operating system, and/or setting registered therein. Continuing with the previous example, the configuration information 148 may include indications of the social media application and the email client. As described in greater detail below, the server 106 may then transmit the configuration information 148 (and/or portions thereof) to the computing device 102.

Returning to the decryption, if the authentication application 138 is unable to decrypt the cryptogram 122 (and/or is unable to verify the MAC) the authentication application 138 does not validate the cryptogram 122. In such an example, the authentication application 138 determines to refrain from accessing the configuration information 148 to automatically configure the computing device 102. The authentication application 138 may transmit, to the computing device 102, a response comprising an indication of the failed decryption and/or verification and an indication that configuration information 148 cannot be used to configure the computing device 102.

Figure 1C:
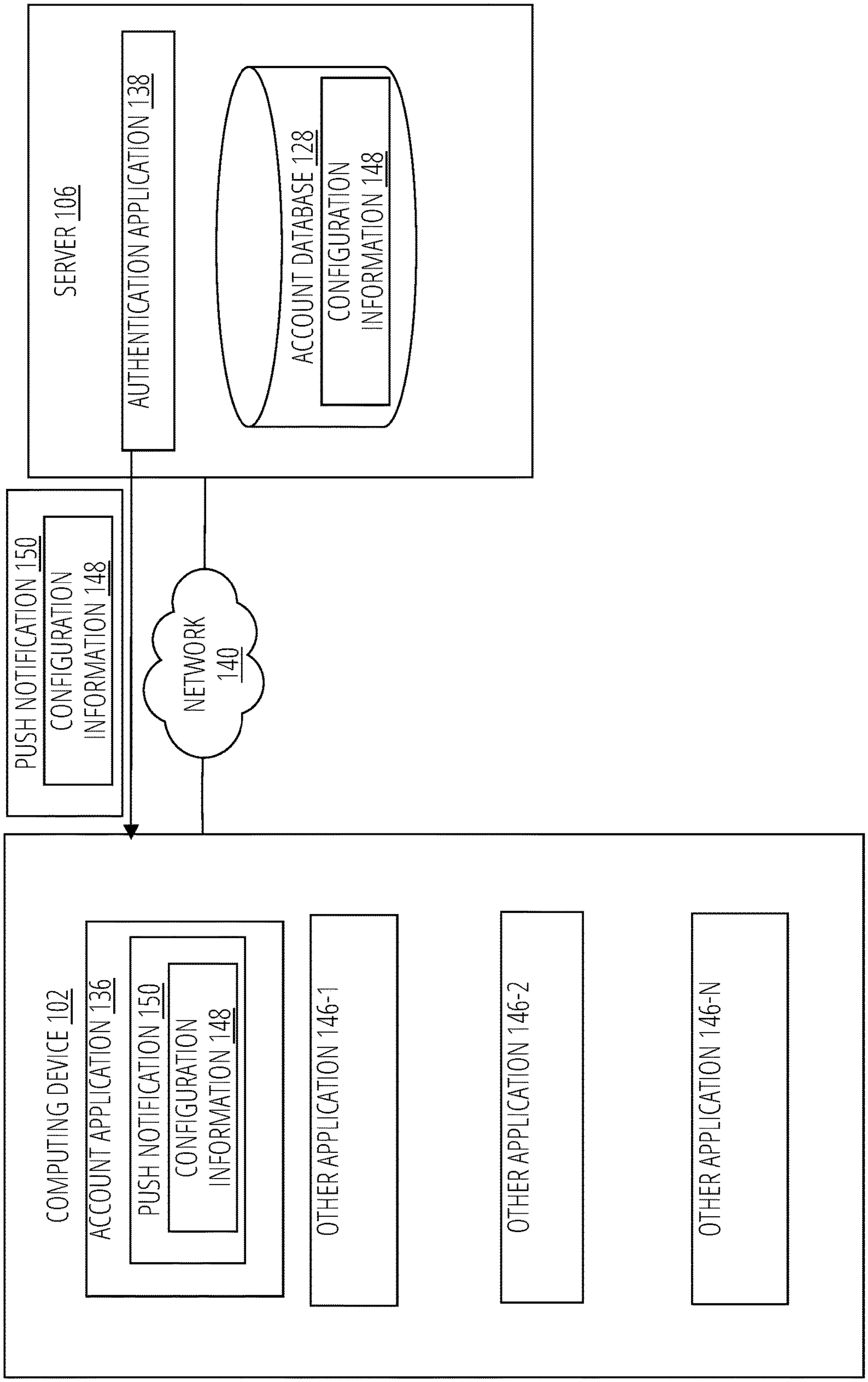
FIG. 1C illustrates an aspect of the subject matter in accordance with one embodiment.

FIG. 1C depicts an embodiment where the authentication application 138 transmits a push notification 150 that includes the configuration information 148 to the account application 136 for each identified application or other software component in the configuration information 148 in the account database 128. In some embodiments, the push notification 150 includes an indication that the server 106 verified the cryptogram 122 and that the configuration information 148 can be used to configure the computing device 102. Although depicted as being transmitted in a single push notification, in some embodiments, the server 106 may transmit multiple push notifications to the computing device 102, where each push notification includes at least a portion of the configuration information 148. In some embodiments, a given push notification may be received in a background of the operating system 134 (e.g., background push notifications that may not be outputted for display on the computing device 102 but are sent directly to the corresponding application and/or to the operating system 134). In some embodiments, the push notifications are foreground push notifications (e.g., notifications that are displayed on the computing device 102). In some embodiments, the configuration information 148 includes one or more configuration files.

Furthermore, in some embodiments, a size of the configuration information 148 (and/or a portion thereof) may exceed a size threshold (e.g., 1 megabyte, 10 megabytes, etc.). In such embodiments, the server 106 may generate one or more tokens, associate each token with one or more portions of the configuration information 148, and transmit the one or more tokens to the computing device 102. The computing device 102 may then transmit the tokens to the server 106 to pull the relevant configuration information 148 (and/or a portion thereof) from the server 106. For example, by associating the token with configuration information 148, the server 106 may provide the associated configuration information 148 based on receipt of the token from the account application 136, the operating system 134, and/or the other applications 146.

In some embodiments, the computing device 102 may transmit the configuration information 148 and/or tokens to the contactless card 104. The contactless card 104 may then store the configuration information 148 and/or tokens in the memory 108. Subsequently, the computing device 102 may receive the configuration information 148 from the contactless card 104 (e.g., via NFC responsive to a tap of the contactless card 104 to the computing device 102) to configure the computing device 102 and any component thereof as described herein.

Furthermore, as shown, FIG. 1C depicts an embodiment where the computing device 102 includes three different applications in addition to the account application 136, e.g., other application 146-1, other application 146-2, and other application 146-N. Advantageously, the account application 136 may use the configuration information 148 to configure these applications on the computing device 102.

Figure 1D:
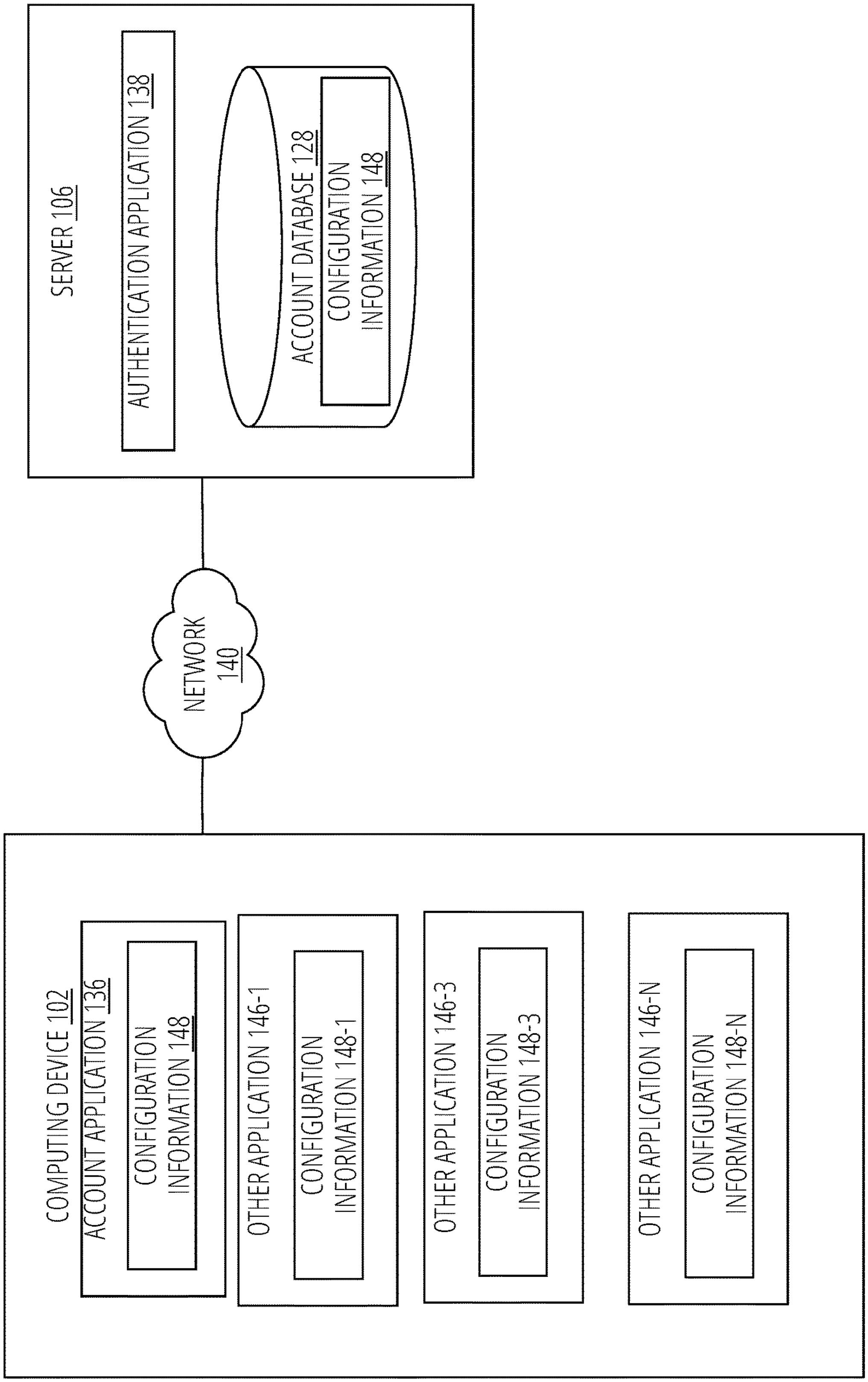
FIG. 1D illustrates an aspect of the subject matter in accordance with one embodiment.

FIG. 1D depicts an embodiment where the account application 136 uses one or more portions of the configuration information 148 received from the server 106 to configure the computing device 102. As stated, the account application 136 may condition the use of the configuration information 148 based on the response from the server 106 indicating that the server 106 verified the cryptogram 122 and that the configuration information 148 can be used to configure the computing device 102. As shown, the account application 136 uses configuration information 148-1 to configure other application 146-1 and configuration information 148-N to configure other application 146-N. In some embodiments, the account application 136 may parse the configuration information 148 to generate the configuration information 148-1 through 148-N. In other embodiments, the server 106 generates the configuration information 148 to include multiple files, one file for each application or other entity being configured on the computing device 102. Therefore, in such embodiments, the configuration information 148-1 through 148-N is generated by the server 106. In some embodiments, at least a portion of the configuration information 148 is associated with the account application 136 and is therefore used to configure the account application 136 (e.g., load user profiles, settings, etc.).

In some embodiments, the account application 136 saves (or writes) the configuration information 148 as a respective configuration file in a location associated with each application and/or the operating system 134. For example, the account application 136 may store the configuration information 148-1 as a configuration file for the other application 146-1 (e.g., with a file name and/or in a file location associated with files that store configuration information for the application 146-1). As another example, the account application 136 may use a portion of the configuration information 148 to store and/or modify one or more files, registry settings, or other parameters of the operating system 134. In some such examples, the account application 136 may provide the configuration information 148 to the operating system 134, where the operating system 134 may use the configuration information 148 to modify the operating system 134. In some embodiments, using the configuration information 148 may cause new configuration information to be written to the computing device 102, may cause some existing configuration information of the computing device 102 to be modified (e.g., by changing values, settings, etc.), and/or may cause other existing configuration information of the computing device 102 to remain unmodified.

Furthermore, the account application 136 uses configuration information 148-3 to determine that an application 146-3 is not installed on the computing device 102. In such embodiments, the account application 136 uses the configuration information 148-3 (e.g., the package name of the application 146-3) to download the application 146-3 from the Internet. The account application 136 may then use the configuration information 148-3 to configure application 146-3 as described herein.

Similarly, the account application 136 uses the configuration information 148 to determine that other application 146-2 is not registered in the configuration information 148. In some embodiments, the account application 136 determines that the other application 146-2 is a restricted application based on the configuration information 148. For example, an enterprise may restrict the use of social media applications on enterprise devices. Therefore, based on the configuration information 148, the account application 136 causes the computing device 102 to uninstall or otherwise disable the other application 146-2. In some embodiments, the account application 136 may permanently restrict a user from reinstalling or otherwise enabling the other application 146-2 (e.g., by configuring the operating system 134 to restrict the other application 146-2 from being installed and/or enabled on the computing device 102.

In some embodiments, the account application 136 may need additional permissions to configure the computing device 102. For example, the account application 136 may need access to storage media (e.g., non-volatile and/or volatile memory, not pictured for clarity) of the computing device 102, e.g., to read, write, or otherwise access the storage. In such embodiments, the account application 136 and/or the operating system 134 may request to grant the account application 136 access to the storage, which may be authorized by the user, and in turn, by the operating system 134.

Therefore, by configuring the computing device 102 using the configuration information 148, the computing device 102 may be automatically configured to include all associated applications, settings, and/or features. For example, by configuring the email client with the configuration information 148, the user may be able to view emails, receive new emails, connect to the email server, and send new emails. Embodiments are not limited in this context. Furthermore, prior to configuring the computing device 102 using the configuration information 148, the user would not be able to view emails, receive emails, connect to the email server, or send emails with the email client (without manually configuring the email client).

Figure 2A:
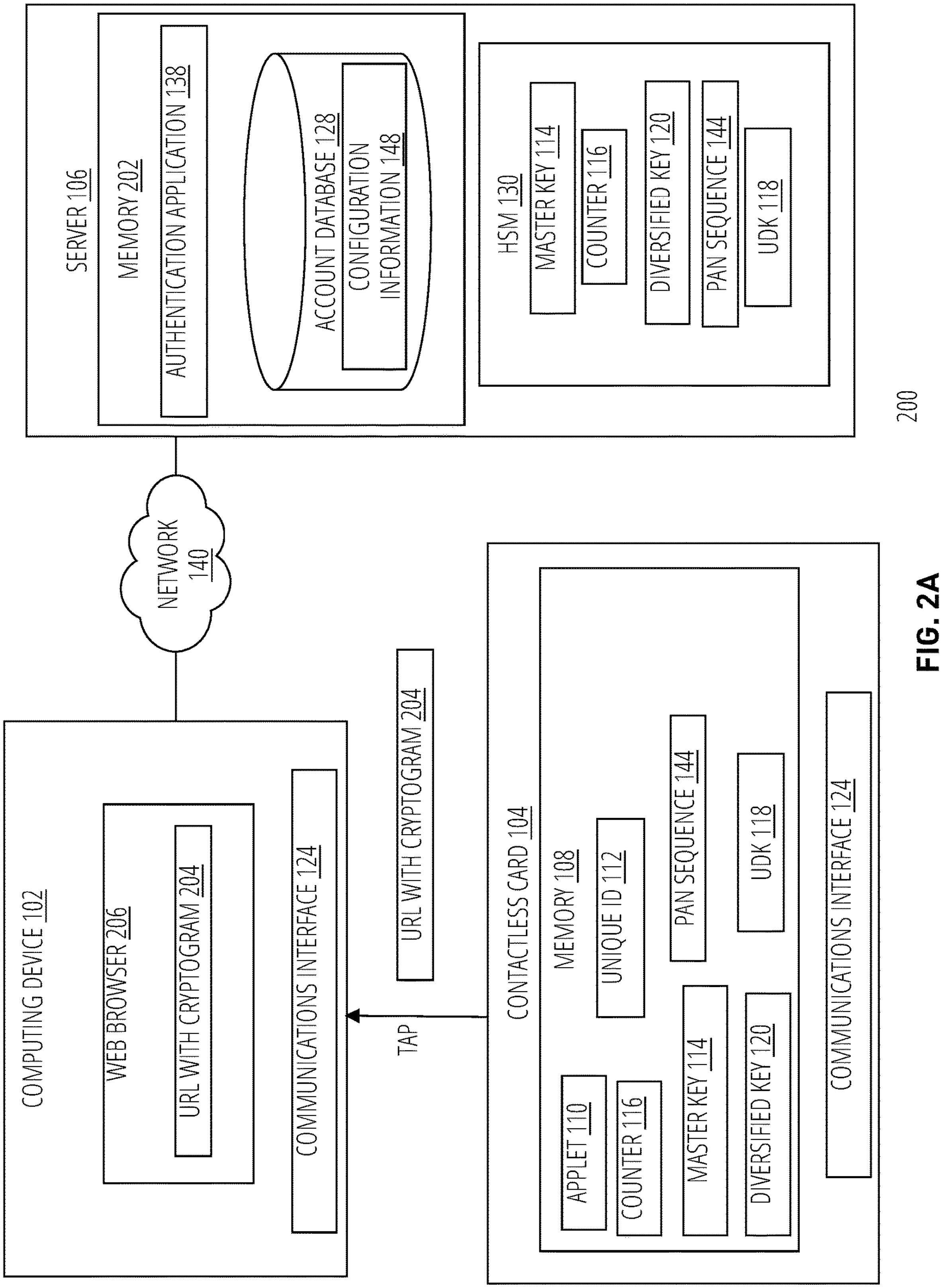
FIG. 2A illustrates an aspect of the subject matter in accordance with one embodiment.

FIG. 2A is a schematic 200 illustrating an embodiment of using a web browser 206 to perform at least a portion of the automatic configuration of the computing device 102. In the example depicted in FIG. 2A, the contactless card 104 generates a URL with cryptogram 204 responsive to tapping the contactless card 104 to the computing device 102. The URL with cryptogram 204 may include a cryptogram generated as described above with reference to the cryptogram 122, along with other relevant information (e.g., unencrypted identifiers, etc.). More generally, the URL with cryptogram 204 may be generated as described above with reference to FIGS. 1A-1D.

Once read by the operating system 134 (not pictured for clarity), the operating system 134 may launch the web browser 206 (e.g., one of the other applications 146) and provide the URL with cryptogram 204 to the web browser 206. Doing so may cause the web browser 206 to access the URL with cryptogram 204 (or a portion thereof). In some embodiments, the URL with cryptogram 204 is directed to a configuration page for automatically configuring the computing device 102. Embodiments are not limited in this context.

Figure 2B:
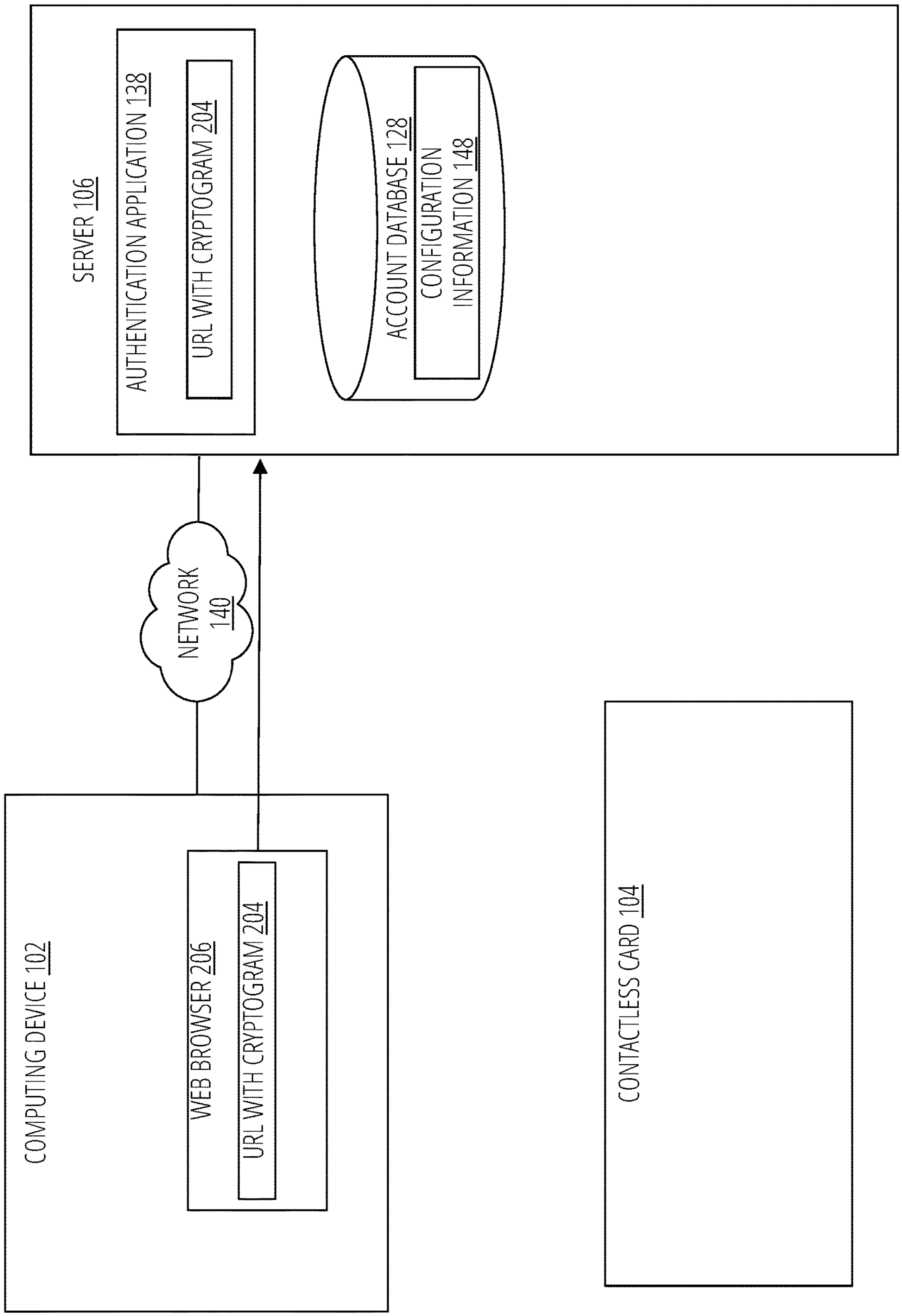
FIG. 2B illustrates an aspect of the subject matter in accordance with one embodiment.

FIG. 2B depicts an embodiment where the web browser 206 accesses the URL with cryptogram 204, e.g., based on a hypertext transfer protocol (HTTP) request that includes the URL with cryptogram 204. As shown, the authentication application 138 may receive the URL with cryptogram 204 based on the HTTP request. The authentication application 138 may then extract the cryptogram from the URL with cryptogram 204 for verification. For example, the server 106 may decrypt the cryptogram and/or verify the MAC contained therein as described above to verify the cryptogram.

Based on the server 106 verifying the cryptogram (e.g., decrypting the cryptogram in the URL with cryptogram 204 and/or verifying the MAC), the server 106 may reference the account database 128 to identify the associated configuration information 148. The server 106 may further transmit, to the computing device 102 (e.g., to the web browser 206 and/or the operating system 134) based on the verification, a response indicating that the server 106 verified the cryptogram 122 and that the configuration information 148 can be used to configure the computing device 102. In some embodiments, the authentication application 138 may access the configuration information 148 based on the unencrypted unique ID 112 provided to the server 106 in the URL with cryptogram 204. Embodiments are not limited in this context, as any suitable identifier may be used to access the configuration information 148 for an account.

If, on the other hand, the server 106 is unable to decrypt the cryptogram and/or verify the MAC, the server 106 does not validate the cryptogram. In such an example, the authentication application 138 determines to refrain from accessing the configuration information 148 to automatically configure the computing device 102. The authentication application 138 may transmit an indication of the failed decryption and/or verification to the computing device 102.

Figure 2C:
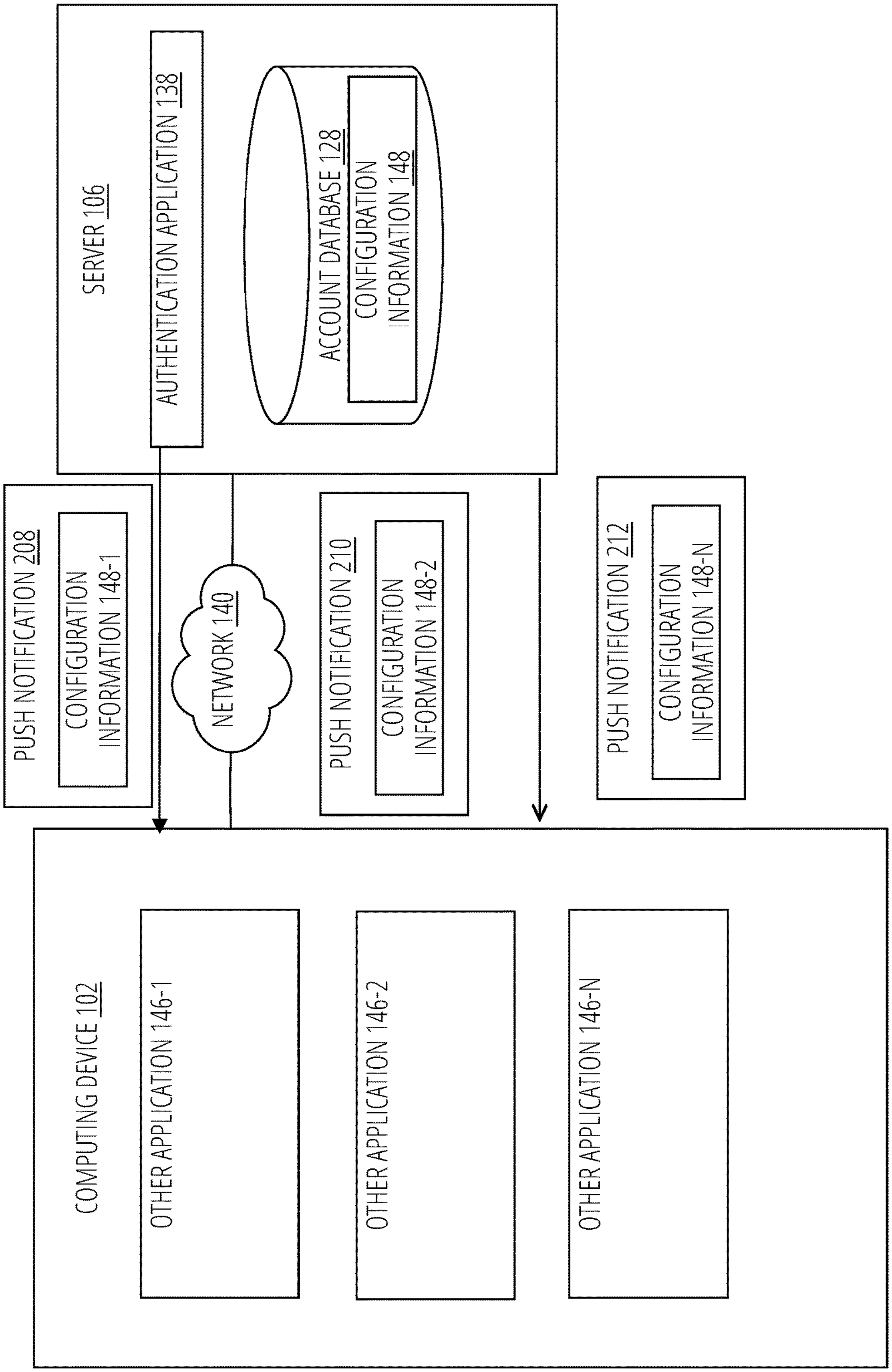
FIG. 2C illustrates an aspect of the subject matter in accordance with one embodiment.

FIG. 2C depicts an embodiment where the server 106 verifies the cryptogram portion of the URL with cryptogram 204. As stated, when the server 106 verifies the cryptogram, the server 106 accesses the configuration information 148 for the account associated with the contactless card 104. The server 106 may then identify a plurality of different applications represented in the configuration information 148. For each identified application, the server 106 may generate a respective push notification that includes the relevant configuration information 148 and/or a portion thereof.

As shown, the server 106 sends push notification 208, push notification 210, and push notification 212 to the computing device 102. As shown, push notification 208 includes configuration information 148-1, push notification 210 includes configuration information 148-2, and push notification 212 includes configuration information 148-N. In such examples, each respective push notification and each instance of configuration information therein may be associated with a respective application executing on the device. In some embodiments, the push notifications may also include a push notification that is transmitted to the operating system 134, which may include configuration information 148 that is applicable to the operating system 134 (e.g., enabling blue light filters, do not disturb functions, etc.). In some embodiments, the push notifications 208, 210, and/or 212 include a respective indication that the server 106 verified the cryptogram 122 and that the configuration information 148 can be used to configure the computing device 102.

In some embodiments, the push notifications 208, 210, and/or 212 may be received in a background of the operating system 134 (e.g., background push notifications that may not be outputted for display on the computing device 102 but are sent directly to the corresponding application and/or to the operating system 134). In some embodiments, the push notifications 208, 210, and/or 212 are foreground push notifications (e.g., notifications that are displayed on the computing device 102). In some embodiments, the configuration information 148 includes one or more configuration files. Furthermore, in some embodiments, a size of the configuration information 148-1 through 148-N may exceed a size threshold. In such embodiments, the server 106 may generate one or more tokens, and include a respective token in each of the push notifications 208, 210, and 212. Once received, each application may then provide the received token to the server 106 to pull the relevant configuration information 148 (and/or a portion thereof) from the server 106.

Figure 2D:
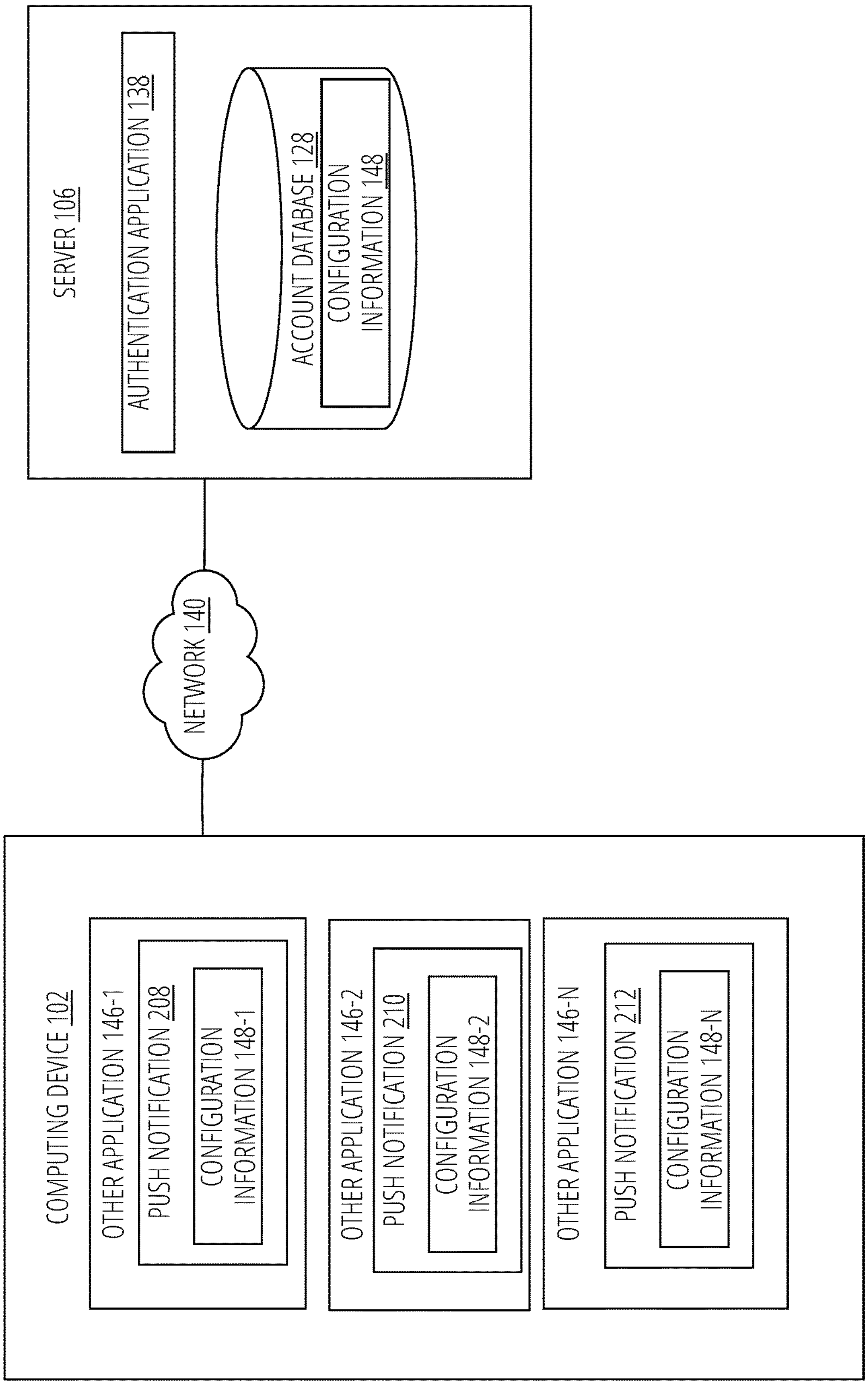
FIG. 2D illustrates an aspect of the subject matter in accordance with one embodiment.

FIG. 2D depicts an embodiment where the push notifications 208, 210, and 212 are received by the other applications 146-1, 146-2, and 146-N, respectively. Generally, once received, the other applications 146-1, 146-2, and 146-N may use the configuration information 148-1, 148-2, and 148-N, respectively, for configuration. For example, other application 146-1 may be configured based on configuration information 148-1, other application 146-2 may be configured based on configuration information 148-2, and other application 146-N may be configured based on configuration information 148-N. In some embodiments, the other applications 146-1, 146-2, and 146-N and/or the operating system 134 condition the use of the configuration information 148 based on receiving the indication from the server 106 that the server 106 verified the cryptogram 122 and that the configuration information 148 can be used to configure the computing device 102.

In some embodiments, the configuration information 148 is saved as a respective configuration file in a location associated with each application and/or the operating system 134. For example, the other application 146-1 may store the configuration information 148-1 as a configuration file for the other application 146-1 (e.g., with a file name and/or in a file location associated with files that store configuration information for the application 146-1). As another example, the other application 146-1 may use a portion of the configuration information 148-1 to store and/or modify one or more files, registry settings, or other parameters of the operating system 134 to configure the other application 146-1. In some such examples, the other application 146-1 may provide the configuration information 148-1 to the operating system 134, where the operating system 134 may use the configuration information 148 to modify the operating system 134. Similarly, application 146-2 may store the configuration information 148-2 as a configuration file for the other application 146-2, and application 146-N may store the configuration information 148-N as a configuration file for the other application 146-N.

In some embodiments, using the configuration information 148-1 through 148-N may cause new configuration information to be written to the computing device 102, may cause some existing configuration information of the computing device 102 to be modified (e.g., by changing values, settings, etc.), and/or may cause other existing configuration information of the computing device 102 to remain unmodified.

Similar to the embodiments depicted in FIGS. 1A-1D, the configuration information 148 may be used to install and/or uninstall applications from the computing device 102. For example, the operating system 134 may receive the push notification 210, and determine that the application 146-2 is not installed on the computing device 102. In such an example, the operating system 134 may download and install application 146-2 on the computing device 102, e.g., from an application store, the Internet, etc. Similarly, if the configuration information 148-N specifies that application 146-N is not permitted to be installed on the device and/or was not registered in the configuration information 148, the configuration information 148-N may cause the application 146-N to initiate the removal (and/or disabling) of application 146-N from the computing device 102.

Advantageously, the configuration information 148 is used to automatically configure and/or restore the computing device 102. By requiring verification of a cryptogram, the configuration of the computing device 102 is completed in a secure manner. More generally, users may quickly restore backups, configure new devices, and/or apply the configuration information 148 from one device to another device. Embodiments are not limited in these contexts.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 3:
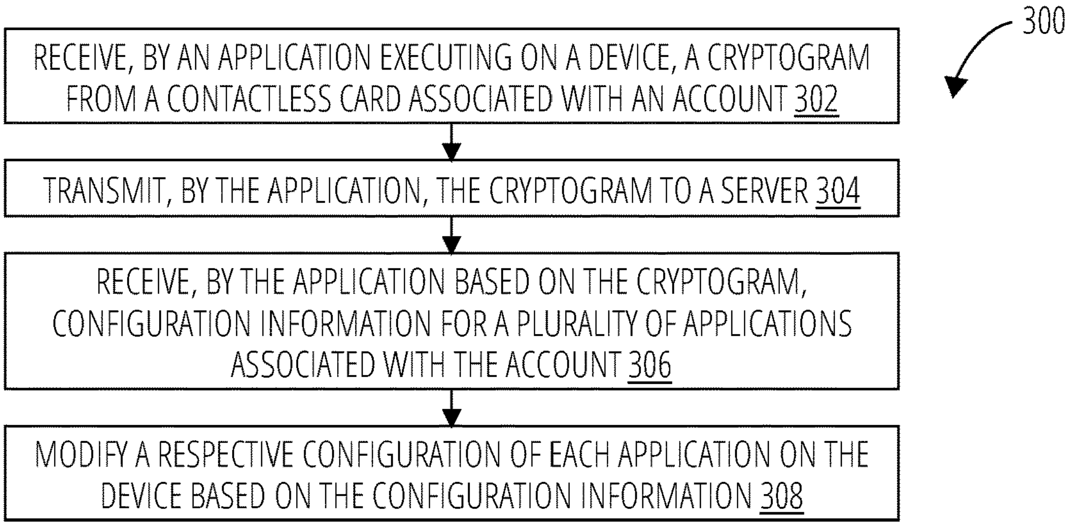
FIG. 3 illustrates a routine 300 in accordance with one embodiment.

FIG. 3 illustrates an embodiment of a logic flow, or routine, 300. The logic flow 300 may be representative of some or all of the operations executed by one or more embodiments described herein. For example, the logic flow 300 may include some or all of the operations to automatically configure a device using configuration information and a contactless card. The embodiments are not limited in this context.

In block 302, routine 300 receives, by an account application 136 executing on a computing device 102, a cryptogram (e.g., the cryptogram 122 and/or the cryptogram of the URL with cryptogram 204) from a contactless card 104 associated with an account. In block 304, routine 300 transmits, by the account application 136, the cryptogram to the server 106. In block 306, routine 300 receives, by the account application 136 based on the server verifying the cryptogram, configuration information 148 for a plurality of applications associated with the account. The server 106 may include, with the configuration information 148, indications specifying the server 106 verified the cryptogram 122 and that the configuration information 148 can be used to configure the computing device 102. The applications may include the other applications 146, the operating system 134, and/or the account application 136. In block 308, routine 300 modifies a respective configuration of each application on the computing device 102 based on the configuration information 148.

Figure 4:
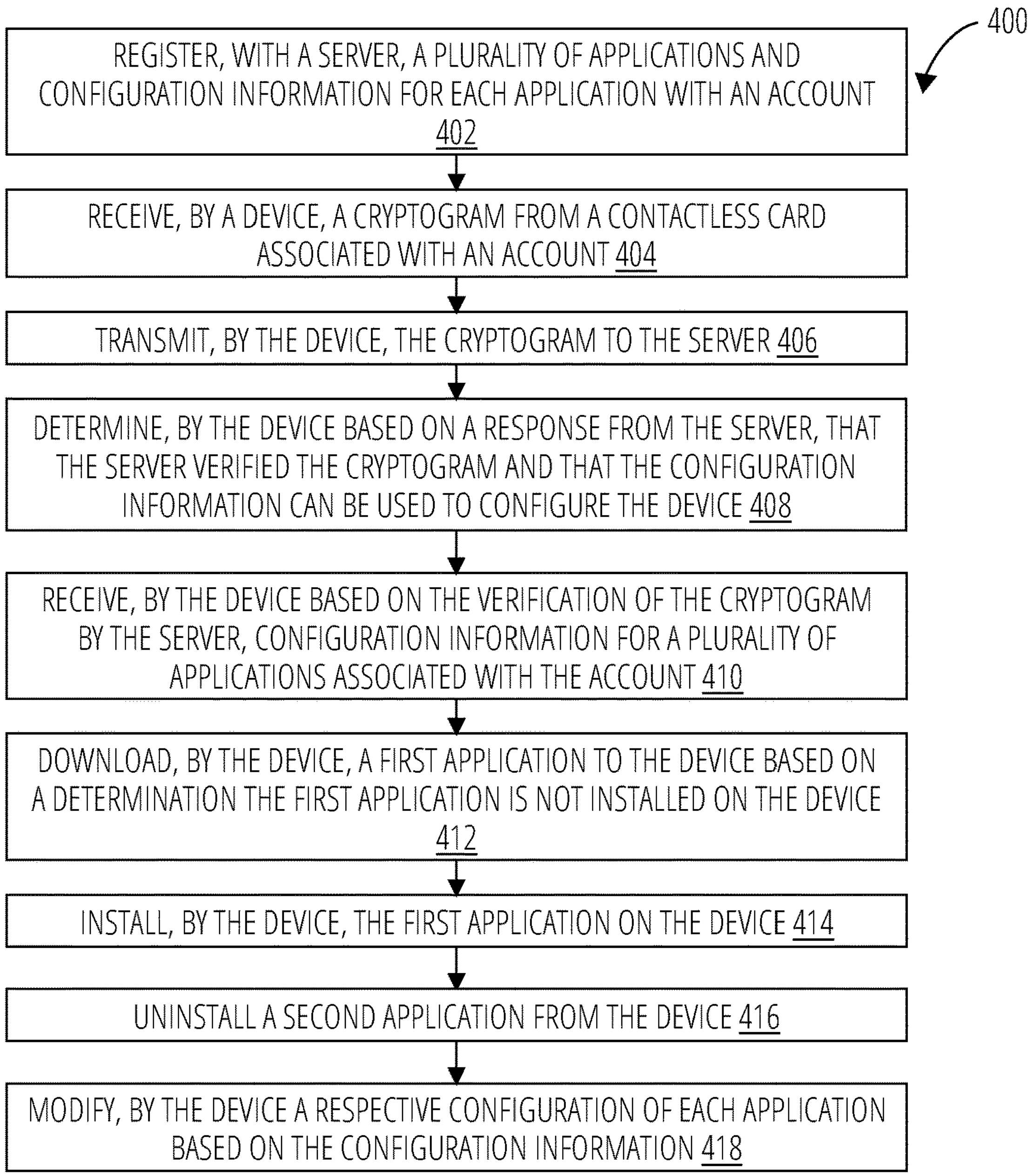
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations to automatically configure a device using configuration information and a contactless card. The embodiments are not limited in this context.

In block 402, routine 400 registers, with a server 106, a plurality of applications and configuration information for each application associated with an account and/or computing device 102. Doing so may cause configuration information 148 to be stored in at least one entry associated with the account in an account database 128. In block 404, routine 400 receives, by a computing device 102, a cryptogram (e.g., the cryptogram 122 and/or the cryptogram of the URL with cryptogram 204) from a contactless card 104 associated with the account. In block 406, routine 400 transmits, by the computing device 102, the cryptogram to the server 106. In block 408, routine 400 determines, by the computing device 102 based on a response received from the server 106, that the server 106 verified the cryptogram and that the configuration information 148 can be used to configure the computing device 102. In block 410, routine 400 receives, by the computing device 102 based on the verification of the cryptogram by the server 106, configuration information 148 for a plurality of applications associated with the account. The applications may include the other applications 146, the operating system 134, and/or the account application 136.

In block 412, routine 400 downloads, by the computing device 102, a first application (e.g., one of the other applications 146) to the device based on a determination the first application is not installed on the computing device 102. In block 414, routine 400 installs, by the computing device 102, the first application on the device. In block 416, routine 400 uninstalls a second application (e.g., another one of the other applications 146) from the computing device 102 based on the configuration information 148. For example, the configuration information 148 may specify to uninstall or disable the second application. In block 418, routine 400 modifies, by the computing device 102 a respective configuration of each application based on the configuration information 148.

Figure 5:
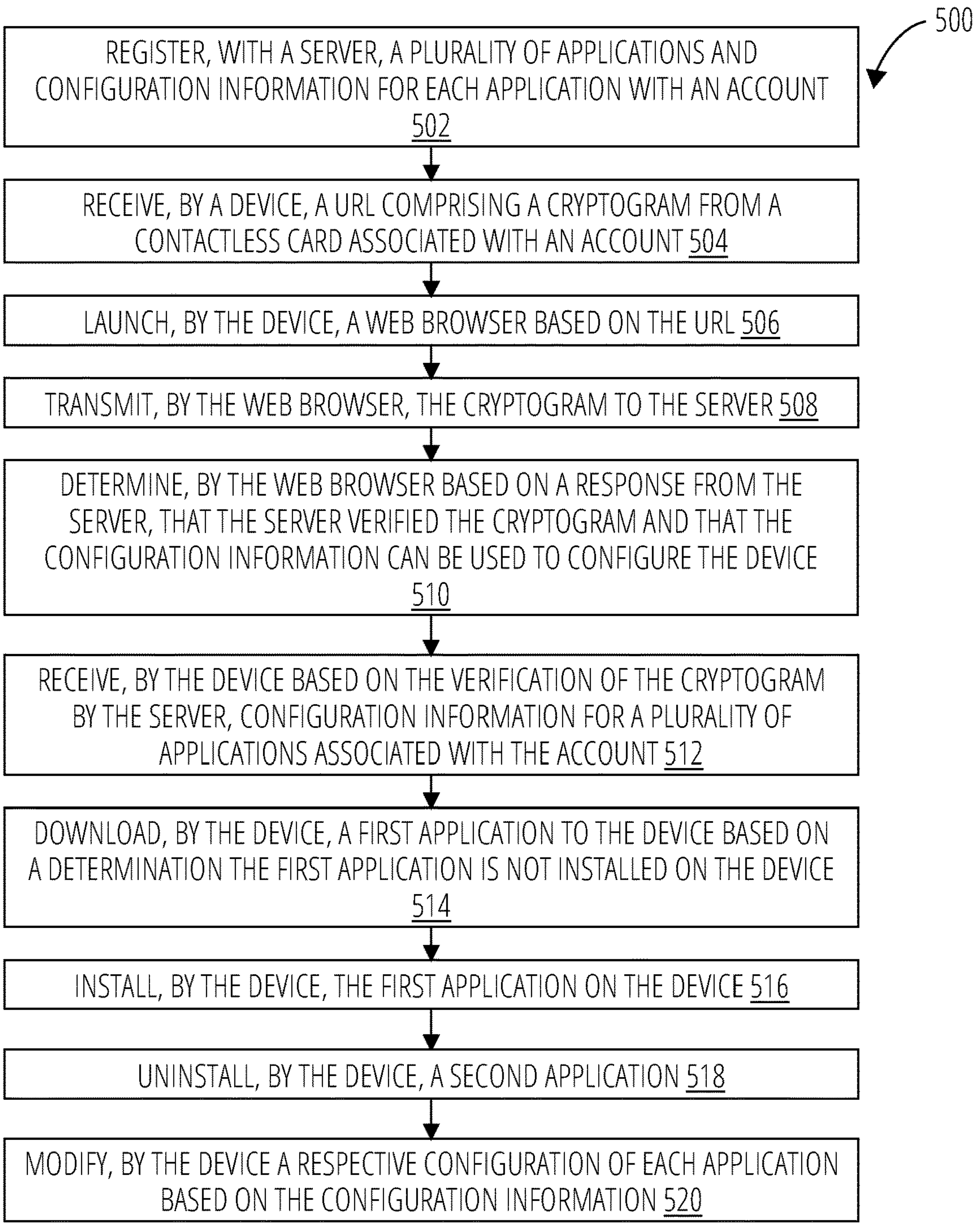
FIG. 5 illustrates a routine 500 in accordance with one embodiment.

FIG. 5 illustrates an embodiment of a logic flow, or routine, 500. The logic flow 500 may be representative of some or all of the operations executed by one or more embodiments described herein. For example, the logic flow 500 may include some or all of the operations to automatically configure a device using configuration information and a contactless card. The embodiments are not limited in this context.

In block 502, routine 500 registers, with a server, a plurality of applications and configuration information for each application with an account. Doing so may cause configuration information 148 to be stored in an entry associated with the account in an account database 128. In block 504, routine 500 receives, by a computing device 102, a URL with cryptogram 204 from a contactless card 104 associated with an account. In block 506, routine 500 launches, by the computing device 102, a web browser based on the URL with cryptogram 204. In block 508, routine 500 transmits, by the web browser 206, at least the cryptogram to the server 106, e.g., by accessing a web page associated with the URL with cryptogram 204. In block 510, routine 500 determines, by the web browser 206 based on a response received from the server, that the server verified the cryptogram from the URL with cryptogram 204 and that the configuration information 148 can be used to configure the computing device 102.

In block 512, routine 500 receives, by the computing device 102 based on the verification of the cryptogram by the server, configuration information 148 for a plurality of applications associated with the account. The applications may include the other applications 146, the operating system 134, and/or the account application 136. In block 514, routine 500 downloads, by the device, a first application to the computing device 102 based on a determination the first application is not installed on the computing device 102. In block 516, routine 500 installs, by the computing device 102, the first application on the computing device 102. In block 518, routine 500 uninstalls a second application (e.g., another one of the other applications 146) from the computing device 102 based on the configuration information 148. For example, the configuration information 148 may specify to uninstall or disable the second application. In block 520, routine 500 modifies, by the computing device 102 a respective configuration of each application based on the configuration information 148.

Figure 6A:
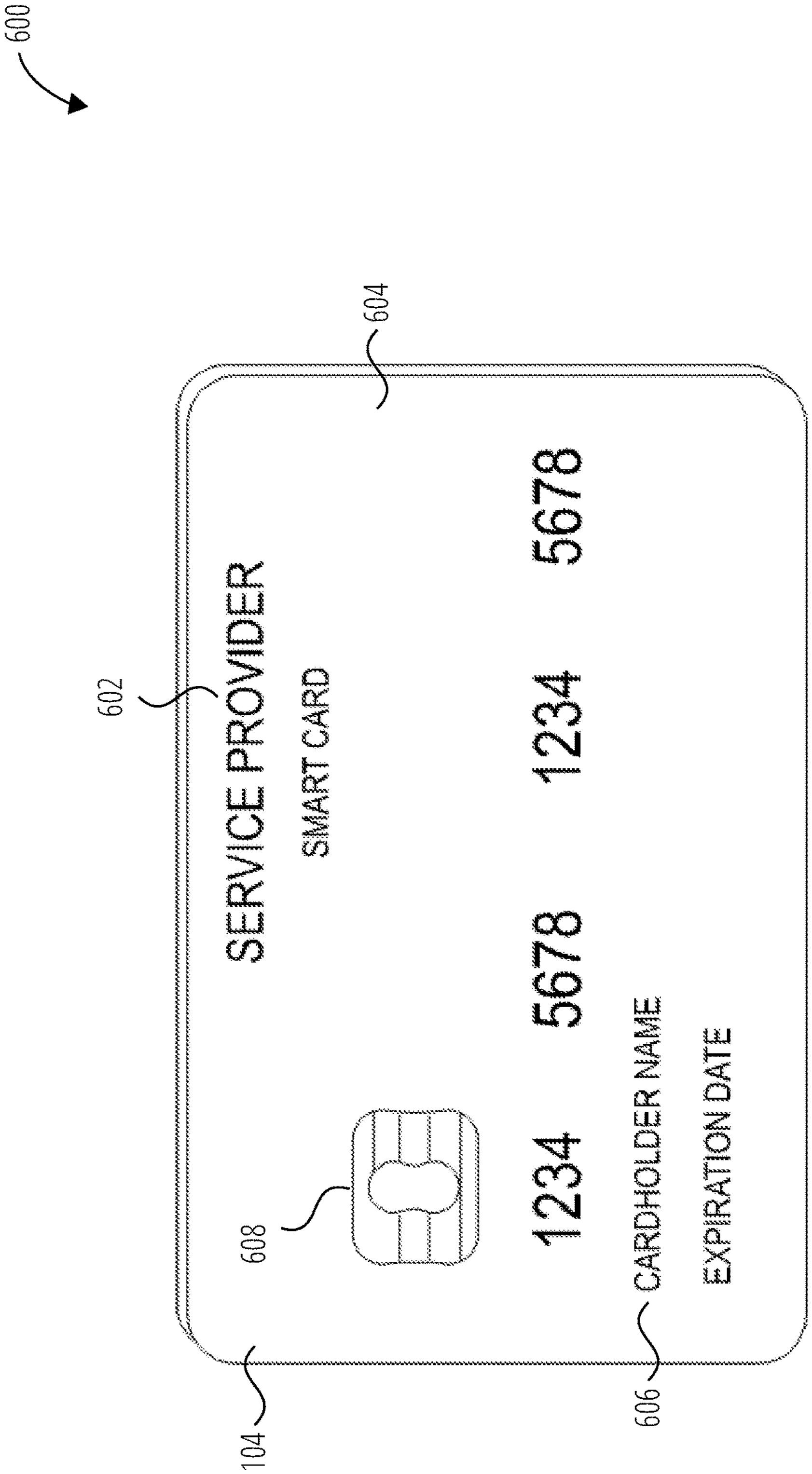
FIG. 6A illustrates a contactless card 104 in accordance with one embodiment.

FIG. 6A is a schematic 600 illustrating an example configuration of a contactless card 104, which may include a payment card, such as a credit card, debit card, or gift card, issued by a service provider as displayed as service provider indicia 602 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 604, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

The contactless card 104 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna and other components as will be further discussed in FIG. 6B. These components may be located behind the contact pad 608 or elsewhere on the substrate 604, e.g. within a different layer of the substrate 604, and may electrically and physically coupled with the contact pad 608. The contactless card 104 may also include a magnetic strip or tape, which may be located on the back of the card (not shown in FIG. 6A). The contactless card 104 may also include a Near-Field Communication (NFC) device coupled with an antenna capable of communicating via the NFC protocol. Embodiments are not limited in this manner.

Figure 6B:
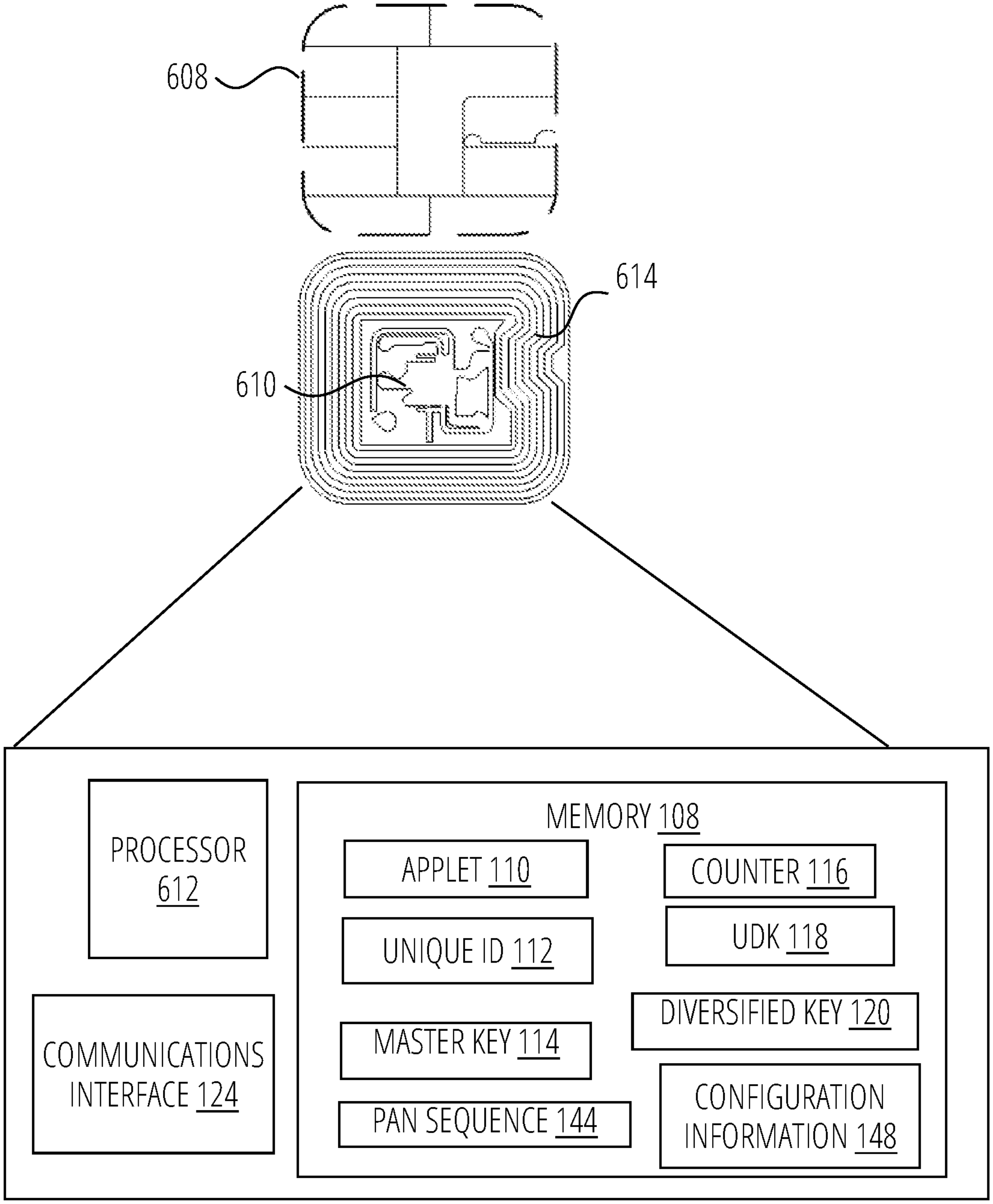
FIG. 6B illustrates a contactless card 104 in accordance with one embodiment.

As illustrated in FIG. 6B, the contact pad 608 of contactless card 104 may include processing circuitry 610 for storing, processing, and communicating information, including a processor 612, a memory 108, and one or more communications interface 124. It is understood that the processing circuitry 610 may contain additional components, including processors, memories, error and parity/CRC checkers, data encoders, anticollision algorithms, controllers, command decoders, security primitives and tamperproofing hardware, as necessary to perform the functions described herein.

The memory 108 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 108 may be encrypted memory utilizing an encryption algorithm executed by the processor 612 to encrypted data.

The memory 108 may be configured to store one or more applet 110, one or more counters 116, a unique ID 112, the master key 114, the UDK 118, diversified key 120, the PAN sequence 144, and the configuration information 148. The configuration information 148 may include one or more tokens generated by the server 106. The one or more applets 110 may comprise one or more software applications configured to execute on one or more contactless cards 104, such as a Java® Card applet. However, it is understood that applets 110 are not limited to Java Card applets, and instead may be any software application operable on contactless cards or other devices having limited memory. The one or more counters 116 may comprise a numeric counter sufficient to store an integer. The unique ID 112 may comprise a unique alphanumeric identifier assigned to the contactless card 104, and the identifier may distinguish the contactless card 104 from other contactless cards 104. In some examples, the unique ID 112 may identify both a customer and an account assigned to that customer.

The processor 612 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 612 and memory 108 elements located within the contact pad 608.

In some examples, the contactless card 104 may comprise one or more antenna(s) 614. The one or more antenna(s) 614 may be placed within the contactless card 104 and around the processing circuitry 610 of the contact pad 608. For example, the one or more antenna(s) 614 may be integral with the processing circuitry 610 and the one or more antenna(s) 614 may be used with an external booster coil. As another example, the one or more antenna(s) 614 may be external to the contact pad 608 and the processing circuitry 610.

In an embodiment, the coil of contactless card 104 may act as the secondary of an air core transformer. The terminal may communicate with the contactless card 104 by cutting power or amplitude modulation. The contactless card 104 may infer the data transmitted from the terminal using the gaps in the power connection of the contactless card 104, which may be functionally maintained through one or more capacitors. The contactless card 104 may communicate back by switching a load on the coil of the contactless card 104 or load modulation. Load modulation may be detected in the terminal's coil through interference. More generally, using the antenna(s) 614, processor 612, and/or the memory 108, the contactless card 104 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet 110 may be added to contactless cards to provide a one-time password (OTP) for multifactor authentication (MFA) in various mobile application-based use cases. Applet 110 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include a cryptogram such as the cryptogram 122 or URL with cryptogram 204, and any other data.

One example of an NDEF OTP is an NDEF short-record layout (SR=1). In such an example, one or more applet 110 may be configured to encode the OTP as an NDEF type 4 well known type text tag. In some examples, NDEF messages may comprise one or more records. The applet 110 may be configured to add one or more static tag records in addition to the OTP record.

In some examples, the one or more applet 110 may be configured to emulate an RFID tag. The RFID tag may include one or more polymorphic tags. In some examples, each time the tag is read, different cryptographic data is presented that may indicate the authenticity of the contactless card. Based on the one or more applet 110, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter 116 may be configured to increment. In some examples, each time data from the contactless card 104 is read (e.g., by a mobile device), the counter 116 is transmitted to the server for validation and determines whether the counter 116 are equal (as part of the validation) to a counter of the server.

The one or more counter 116 may be configured to prevent a replay attack. For example, if a cryptogram has been obtained and replayed, that cryptogram is immediately rejected if the counter 116 has been read or used or otherwise passed over. If the counter 116 has not been used, it may be replayed. In some examples, the counter that is incremented on the contactless card 104 is different from the counter that is incremented for transactions. The contactless card 104 is unable to determine the application transaction counter 116 since there is no communication between applets 110 on the contactless card 104. In some examples, the contactless card 104 may comprise a first applet 440-1, which may be a transaction applet, and a second applet 440-2. Each applet 440-1 and 440-2 may comprise a respective counter 116.

In some examples, the counter 116 may get out of sync. In some examples, to account for accidental reads that initiate transactions, such as reading at an angle, the counter 116 may increment but the application does not process the counter 116. In some examples, when the mobile device 10 is woken up, NFC may be enabled and the computing device 102 may be configured to read available tags, but no action is taken responsive to the reads.

To keep the counter 116 in sync, an application, such as a background application, may be executed that would be configured to detect when the computing device 102 wakes up and synchronize with the server of a banking system indicating that a read that occurred due to detection to then move the counter 116 forward. In other examples, Hashed One Time Password may be utilized such that a window of mis-synchronization may be accepted. For example, if within a threshold of 10, the counter 116 may be configured to move forward. But if within a different threshold number, for example within 10 or 1000, a request for performing re-synchronization may be processed which requests via one or more applications that the user tap, gesture, or otherwise indicate one or more times via the user's device. If the counter 116 increases in the appropriate sequence, then it possible to know that the user has done so.

The key diversification technique described herein with reference to the counter 116, master key 114, UDK 118, and diversified key 120, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys (e.g., the UDKs 118) and the counter may be used as diversification data. For example, each time the contactless card 104 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
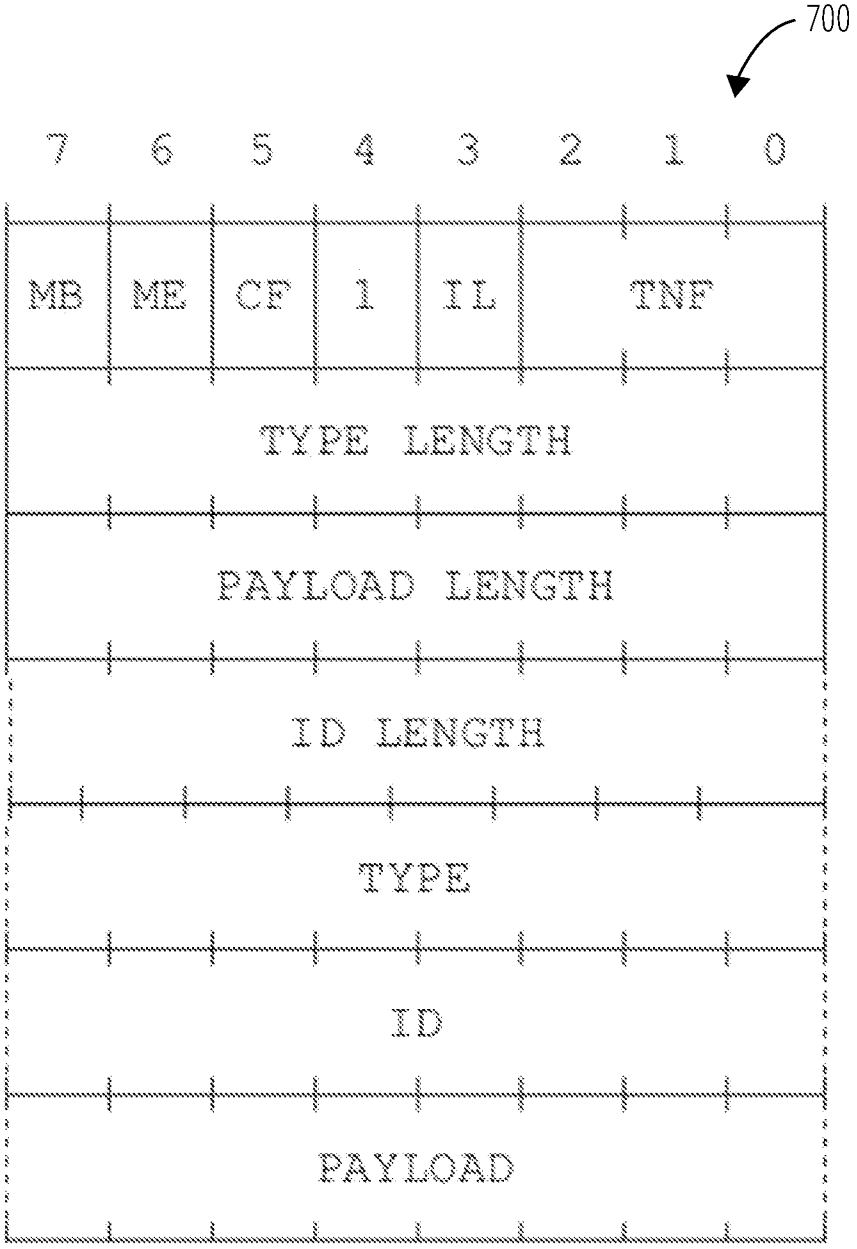
FIG. 7 illustrates a data structure 700 in accordance with one embodiment.

FIG. 7 illustrates an NDEF short-record layout (SR=1) data structure 700 according to an example embodiment. One or more applets 110 may be configured to encode an OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 700 may include a cryptogram such as cryptogram 122 or URL with cryptogram 204, and any other data provided by the applet 110.

Figure 8:
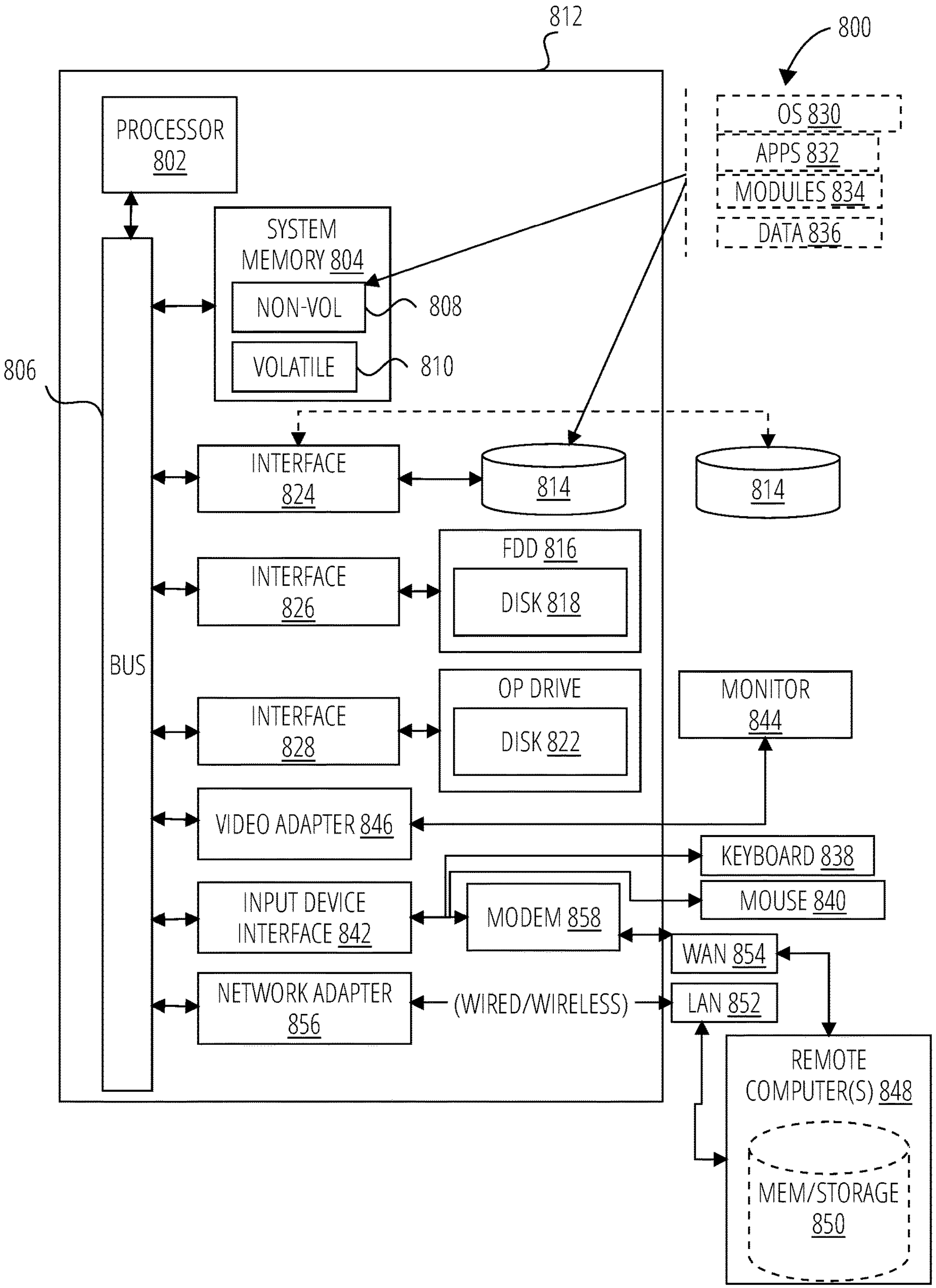
FIG. 8 illustrates a computer architecture 800 in accordance with one embodiment.

FIG. 8 illustrates an embodiment of an exemplary computer architecture 800 suitable for implementing various embodiments as previously described. In one embodiment, the computer architecture 800 may include or be implemented as part of computing architecture 100 and/or 200. In some embodiments, computing system 800 may be representative, for example, of the contactless card 104, computing devices 102, and/or server 106 The embodiments are not limited in this context. More generally, the computing architecture 800 is configured to implement all logic, applications, systems, methods, apparatuses, and functionality described herein with reference to FIGS. 1A-7.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 800.

As shown in FIG. 8, the computer architecture 800 includes a computer 812 comprising a processor 802, a system memory 804 and a system bus 806. The processor 802 can be any of various commercially available processors. The computer 812 may be representative of the computing device 102 and/or the server 106.

The system bus 806 provides an interface for system components including, but not limited to, the system memory 804 to the processor 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 812 may include various types of computer-readable storage media in the form of one or more lower speed memory units, including an internal (or external) hard disk drive 814, a magnetic disk drive 816 to read from or write to a removable magnetic disk 818, and an optical disk drive 820 to read from or write to a removable optical disk 822 (e.g., a CD-ROM or DVD). The hard disk drive 814, magnetic disk drive 816 and optical disk drive 820 can be connected to the system bus 806 by an HDD interface 824, and FDD interface 826 and an optical disk drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 830, one or more applications 832, other program modules 834, and program data 836. In one embodiment, the one or more applications 832, other program modules 834, and program data 836 can include, for example, the various applications and/or components of the system 100.

A user can enter commands and information into the computer 812 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 802 through an input device interface 842 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 812. In addition to the monitor 844, a computer typically includes other peripheral output devices, such as speakers, printers, and so forth.

The computer 812 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 812, although, for purposes of brevity, only a memory and/or storage device 850 is illustrated. The logical connections depicted include wire/wireless connectivity to a local area network 852 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 852 networking environment, the computer 812 is connected to the local area network 852 through a wire and/or wireless communication network interface or network adapter 856. The network adapter 856 can facilitate wire and/or wireless communications to the local area network 852, which may also include a wireless access point disposed thereon for communicating with the wireless functionality of the network adapter 856.

When used in a wide area network 854 networking environment, the computer 812 can include a modem 858, or is connected to a communications server on the wide area network 854 or has other means for establishing communications over the wide area network 854, such as by way of the Internet. The modem 858, which can be internal or external and a wire and/or wireless device, connects to the system bus 806 via the input device interface 842. In a networked environment, program modules depicted relative to the computer 812, or portions thereof, can be stored in the remote memory and/or storage device 850. It will be appreciated that the network connections shown are exemplary and other means of establishing a communications link between the computers can be used.

The computer 812 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-12 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

receiving, by an application executing on a mobile device associated with a user account, a cryptogram from a contactless card associated with the user account, the cryptogram being included as part of a digital link sent by the contactless card;

transmitting, by the application, the cryptogram to a server;

receiving, by the application based on the cryptogram, configuration information for a plurality of applications associated with the user account; and modifying a respective configuration of each application on the mobile device based on the configuration information.

2. The method of claim 1, further comprising, prior to modifying the configuration of each application:

determining, by the application, that a first application of the plurality of applications is not installed on the mobile device; and downloading, by the application, the first application to the mobile device; and installing, by an operating system (OS) of the mobile device, the first application on the mobile device.

3. The method of claim 2, further comprising subsequent to installing the first application on the mobile device:

modifying the configuration of the first application based on the configuration information of the first application.

4. The method of claim 1, wherein receiving the configuration information comprises receiving a plurality of configuration files from the server; and wherein the configuration information includes a software backup of at least a portion of the mobile device, wherein the software backup is configured to restore the mobile device to a configuration corresponding to the software backup.

5. The method of claim 1, wherein the configuration information comprises: (i) information for connecting to one or more servers, (ii) account information, (iii) messages, (iv) preferences, and (v) settings; and wherein the cryptogram is based on a unique identifier assigned to the contactless card.

6. A non-transitory computer-readable storage medium, the computer-readable storage medium including instructions that when executed by a processor of a mobile device associated with a user account, cause the processor to perform operations comprising:

receiving a cryptogram from a contactless card associated with the user account, the cryptogram being included as part of a digital link sent by the contactless card;

transmitting the cryptogram to a server;

receiving, based on the cryptogram, configuration information for a plurality of applications associated with the user account; and modifying a respective configuration of each application on the mobile device based on the configuration information.

7. The computer-readable storage medium of claim 6, wherein execution of the instructions by the processor further cause the processor to, prior to modifying the configuration of each application, perform operations comprising:

determining that a first application of the plurality of applications is not installed on the mobile device; and downloading the first application to the mobile device; and installing the first application on the mobile device.

8. The computer-readable storage medium of claim 7, wherein execution of the instructions by the processor further cause the processor to, subsequent to installing the first application on the mobile device, perform operations comprising:

modifying the configuration of the first application based on the configuration information of the first application.

9. The computer-readable storage medium of claim 6, wherein receiving the configuration information comprises receiving a plurality of configuration files from the server; and wherein the configuration information includes a software backup of at least a portion of the mobile device, wherein the software backup is configured to restore the mobile device to a configuration corresponding to the software backup.

10. The computer-readable storage medium of claim 6, wherein the configuration information comprises: (i) information for connecting to one or more servers, (ii) account information, (iii) messages, (iv) preferences, and (v) settings; and wherein the cryptogram is based on a unique identifier assigned to the contactless card.

11. A computing apparatus associated with a user account comprising:

a processor; and a memory storing instructions that, when executed by the processor, cause the processor to:

receive a cryptogram from a contactless card associated with the user account, the cryptogram being included as part of a digital link sent by the contactless card;

transmit the cryptogram to a server;

receive, based on the cryptogram, configuration information for a plurality of applications associated with the user account; and modify a respective configuration of each application on the computing apparatus based on the configuration information.

12. The computing apparatus of claim 11, wherein execution of the instructions by the processor further cause the processor to:

prior to modifying the configuration of each application:

determine that a first application of the plurality of applications is not installed on the computing apparatus; and download the first application to the computing apparatus; and install the first application on the computing apparatus.

13. The computing apparatus of claim 12, wherein execution of the instructions by the processor further cause the processor to, subsequent to installing the first application, perform operations comprising:

modify the configuration of the first application based on the configuration information of the first application.

14. The computing apparatus of claim 11, wherein receiving the configuration information comprises receiving a plurality of configuration files from the server; and wherein the configuration information includes a software backup of at least a portion of the computing apparatus, wherein the software backup is configured to restore the computing apparatus to a configuration corresponding to the software backup.

15. The method of claim 1, wherein the digital link comprises a uniform resource locator (URL), and the cryptogram is transmitted as a parameter of the URL sent from the contactless card to the application.

16. The method of claim 1, wherein the configuration information includes a software backup of at least a portion of a second mobile device, and the method further comprises downloading a new application identified in the software backup that was on the second mobile device but not on the mobile device.

17. The computer-readable storage medium of claim 6, wherein the digital link comprises a uniform resource locator (URL), and the cryptogram is transmitted as a parameter of the URL sent from the contactless card to the processor.

18. The computer-readable storage medium of claim 6, wherein the configuration information includes a software backup of at least a portion of a second mobile device, and the operations further include downloading onto the mobile device a new application identified in the software backup that was on the second mobile device but not on the mobile device.

19. The computing apparatus of claim 11, wherein the digital link comprises a uniform resource locator (URL), and the cryptogram is transmitted as a parameter of the URL sent from the contactless card to the application.

20. The computing apparatus of claim 11, wherein the configuration information includes a software backup of at least a portion of a second computing apparatus, and the processor is further configured to download onto the computing apparatus a new application identified in the software backup that was on the second computing apparatus but not on the computing apparatus.

* * * * *